June 13, 1933.  E. F. BRITTEN, JR  1,913,973
CALCULATING MACHINE
Filed Sept. 29, 1931   20 Sheets-Sheet 1
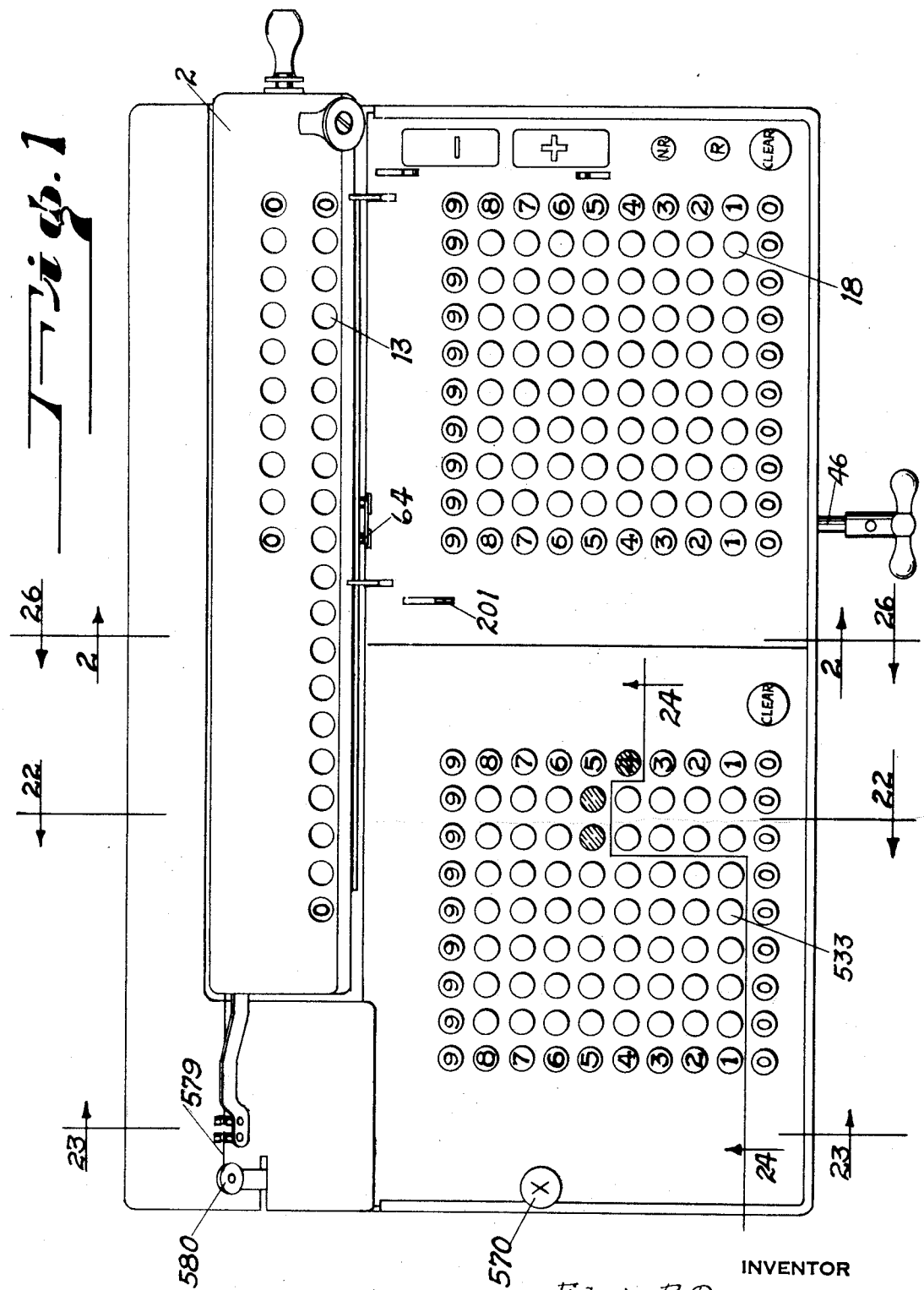
INVENTOR
Edwin F. Britten, Jr.
BY
Stuart Wilder ATTORNEY

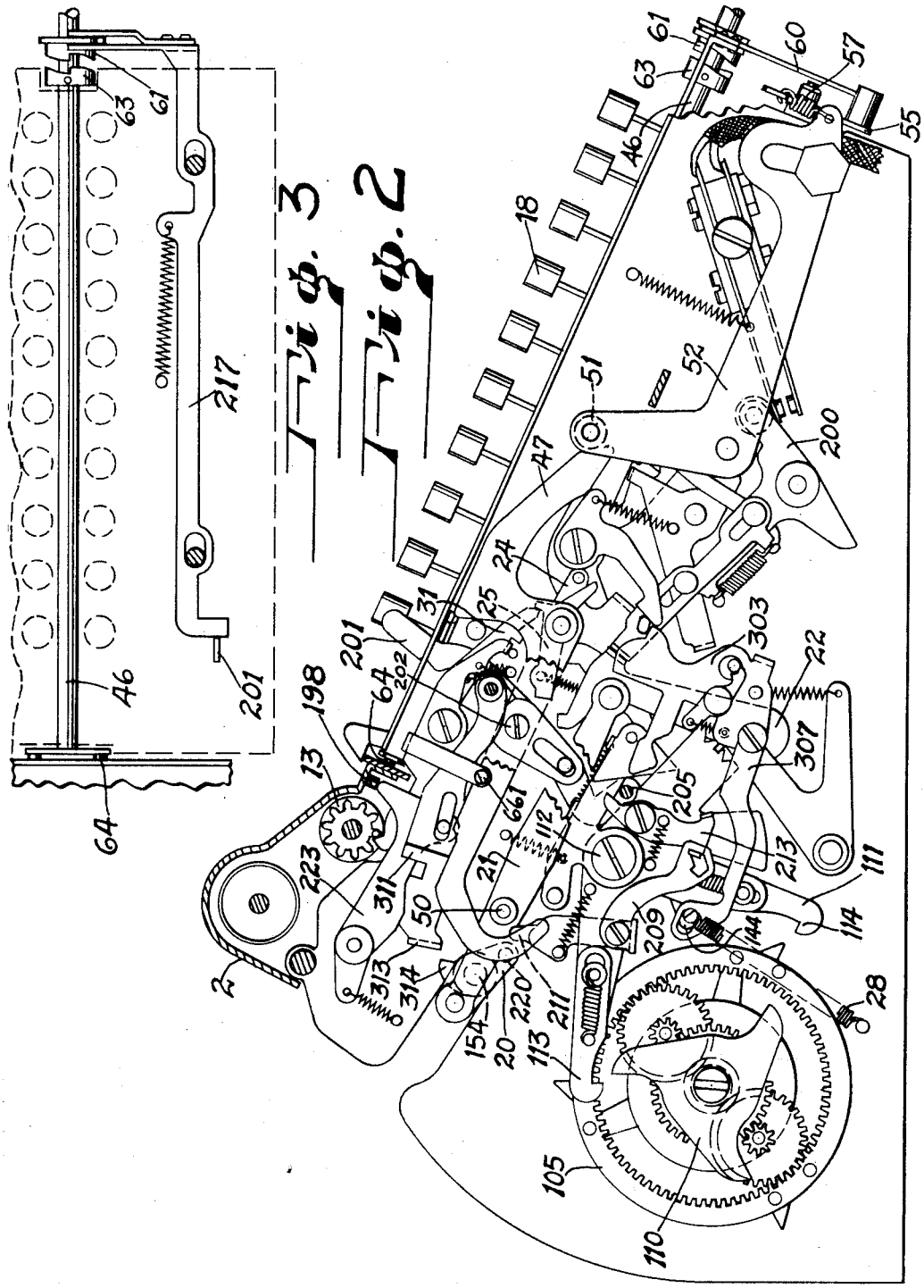

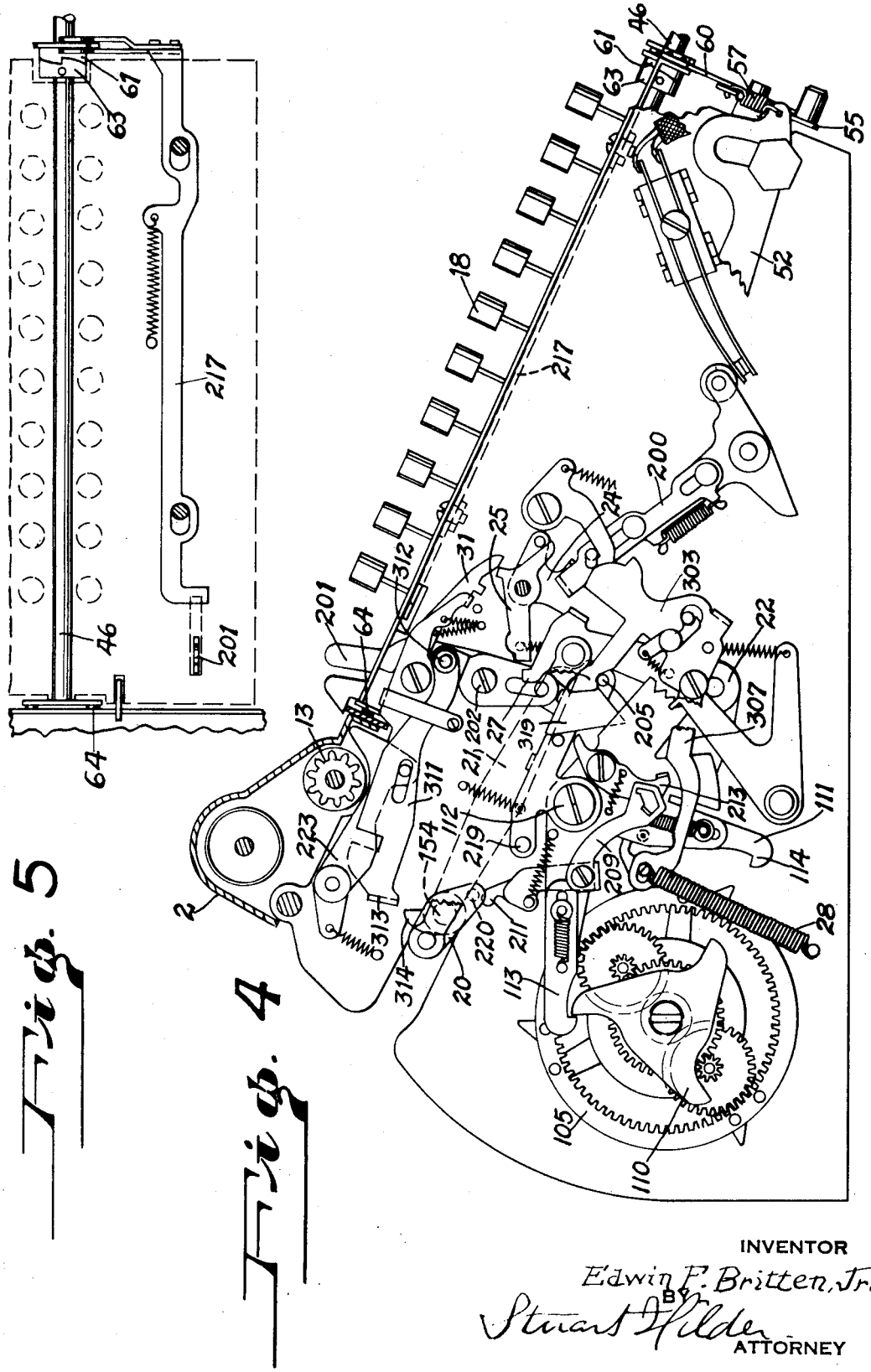

June 13, 1933.  E. F. BRITTEN, JR  1,913,973
CALCULATING MACHINE
Filed Sept. 29, 1931   20 Sheets-Sheet 4
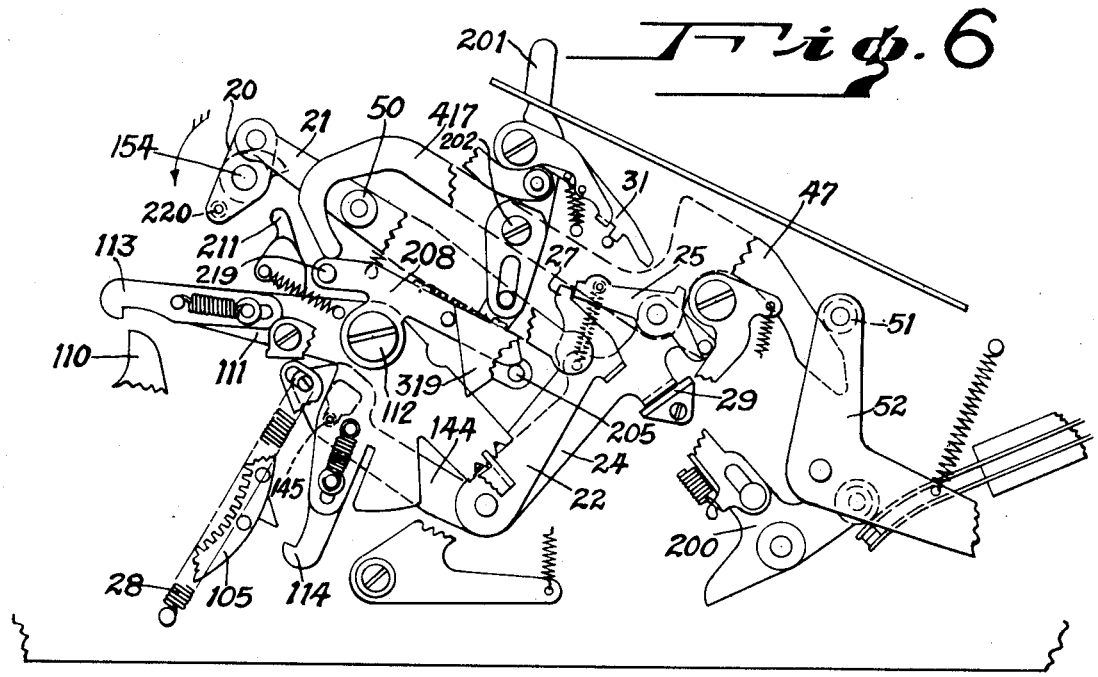
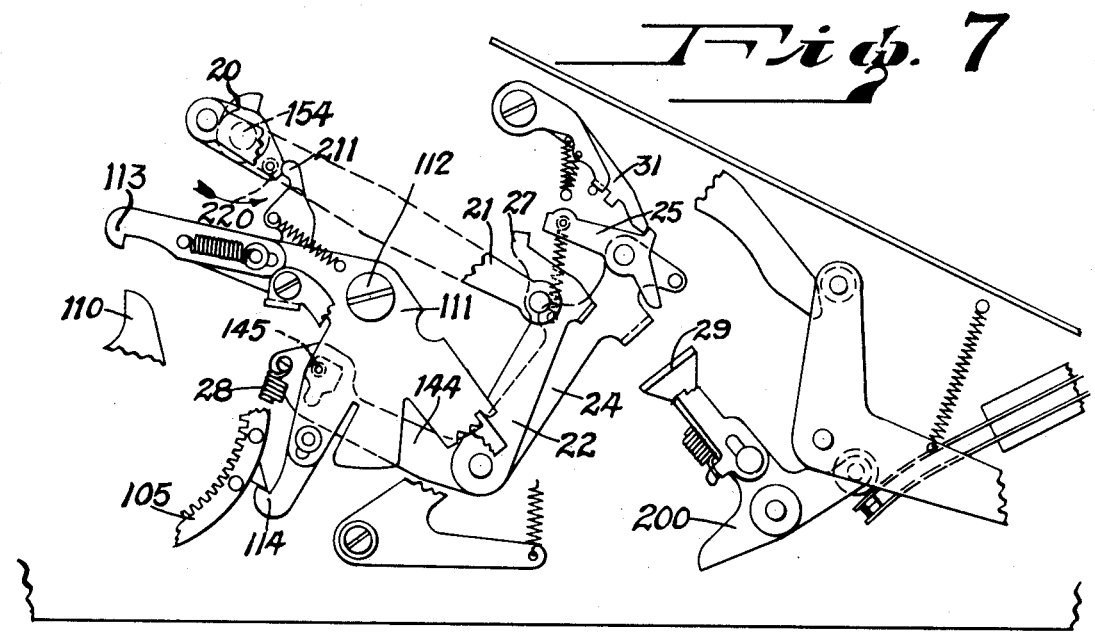
INVENTOR
Edwin F. Britten, Jr.
BY
Stuart Hilder ATTORNEY June 13, 1933.    E. F. BRITTEN, JR    1,913,973
CALCULATING MACHINE
Filed Sept. 29, 1931    20 Sheets-Sheet 5
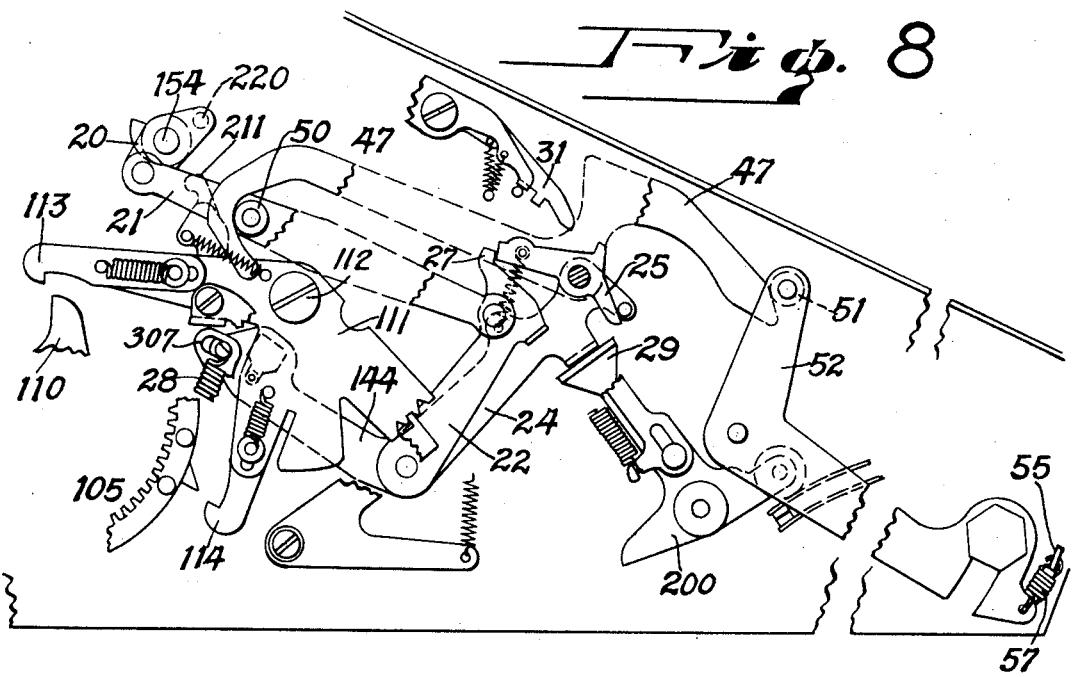
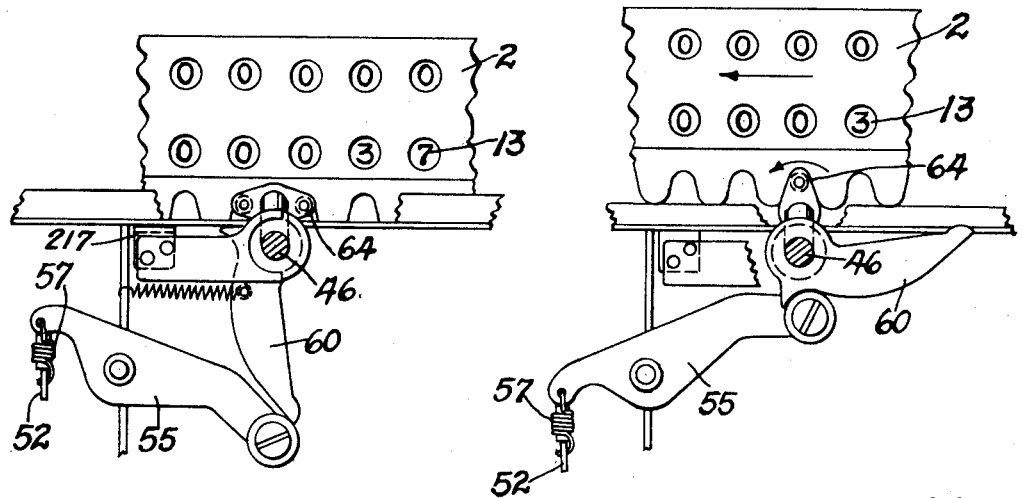
INVENTOR
Edwin F. Britten, Jr.
BY
Stuart Wilder ATTORNEY

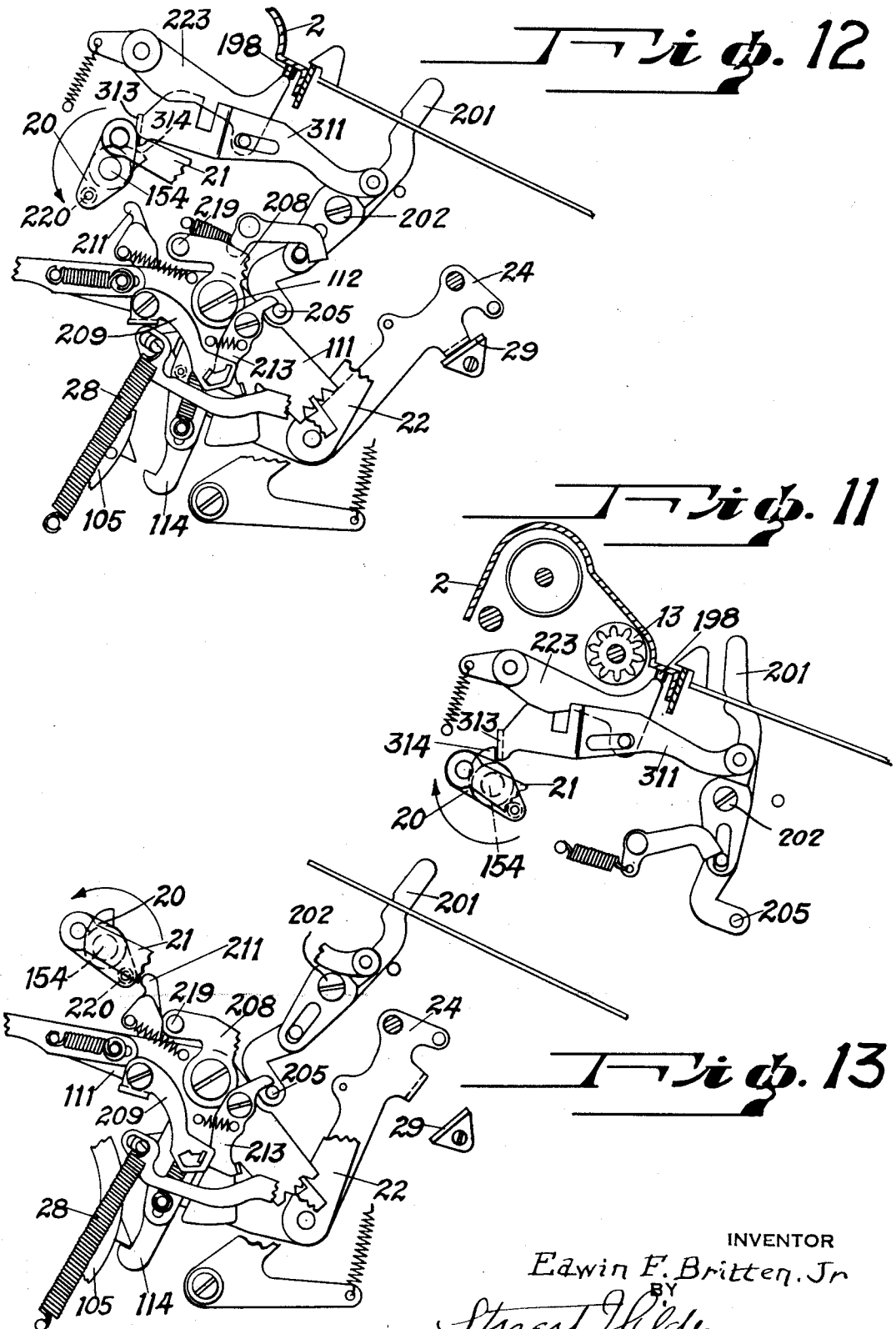

June 13, 1933.  E. F. BRITTEN, JR  1,913,973
CALCULATING MACHINE
Filed Sept. 29, 1931   20 Sheets-Sheet 7

INVENTOR
Edwin F. Britten, Jr.
BY
Stuart Hilder ATTORNEY

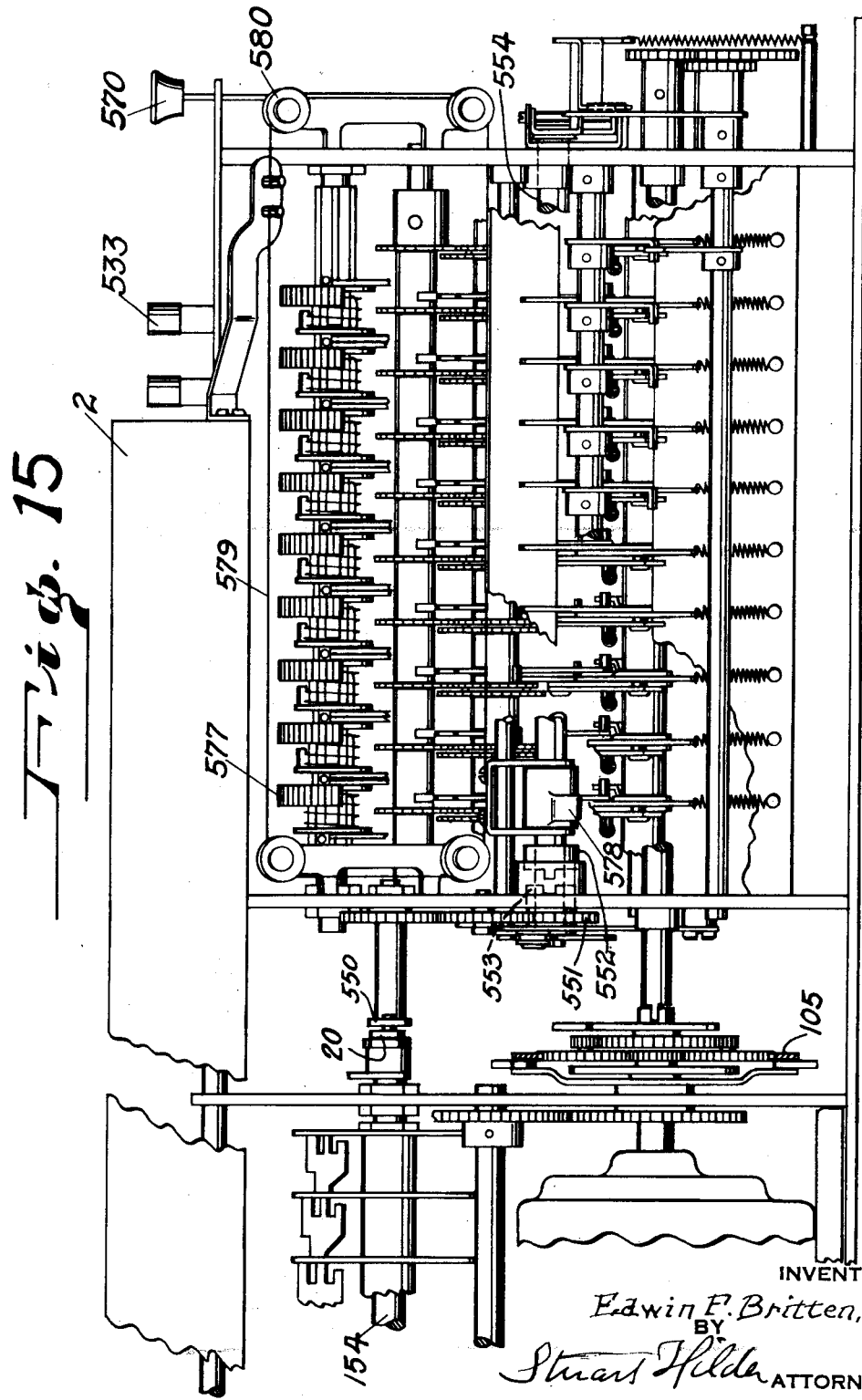

June 13, 1933. E. F. BRITTEN, JR 1,913,973
CALCULATING MACHINE
Filed Sept. 29, 1931 20 Sheets-Sheet 9
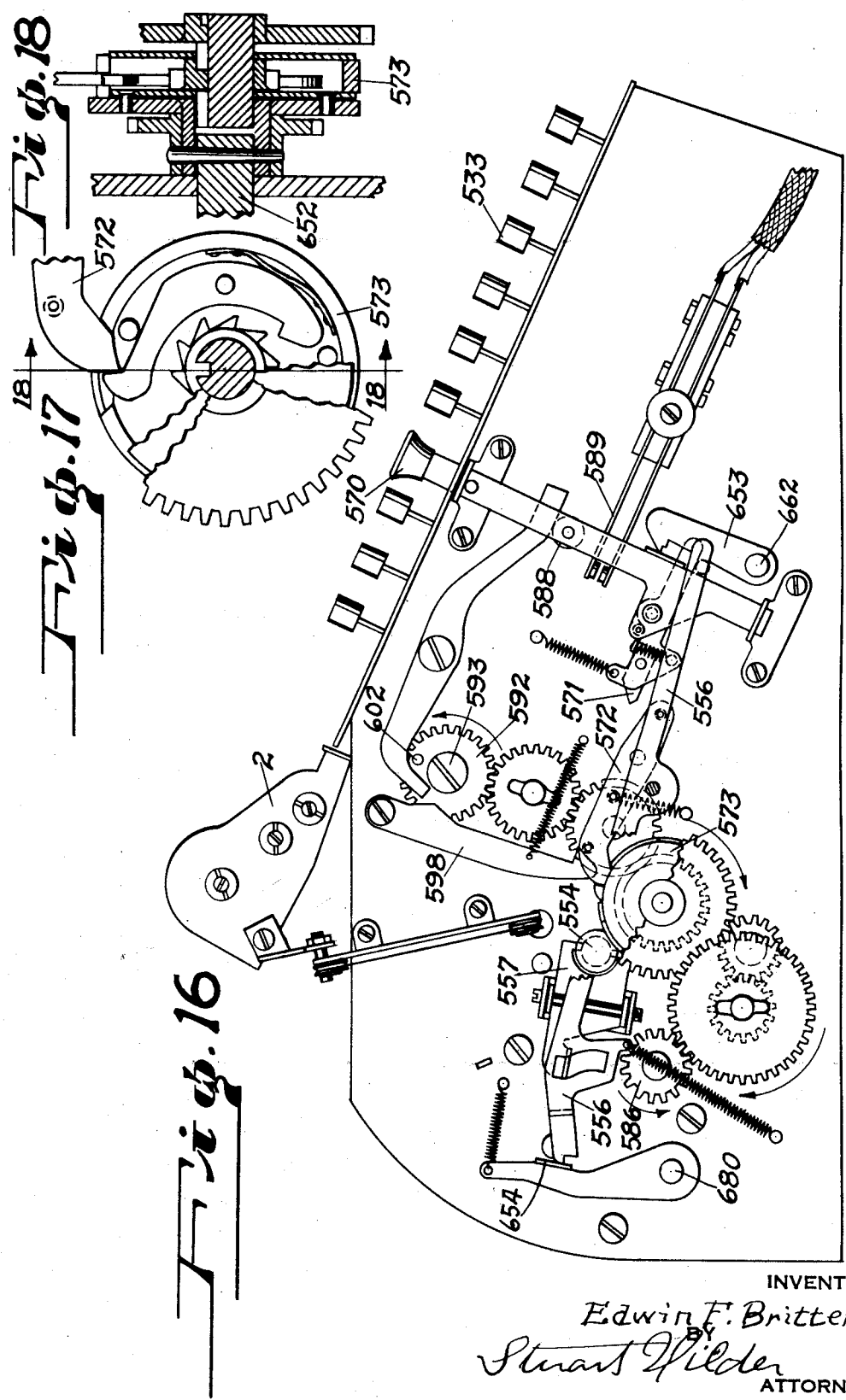
INVENTOR
Edwin F. Britten, Jr.
BY Stuart Wilder
ATTORNEY

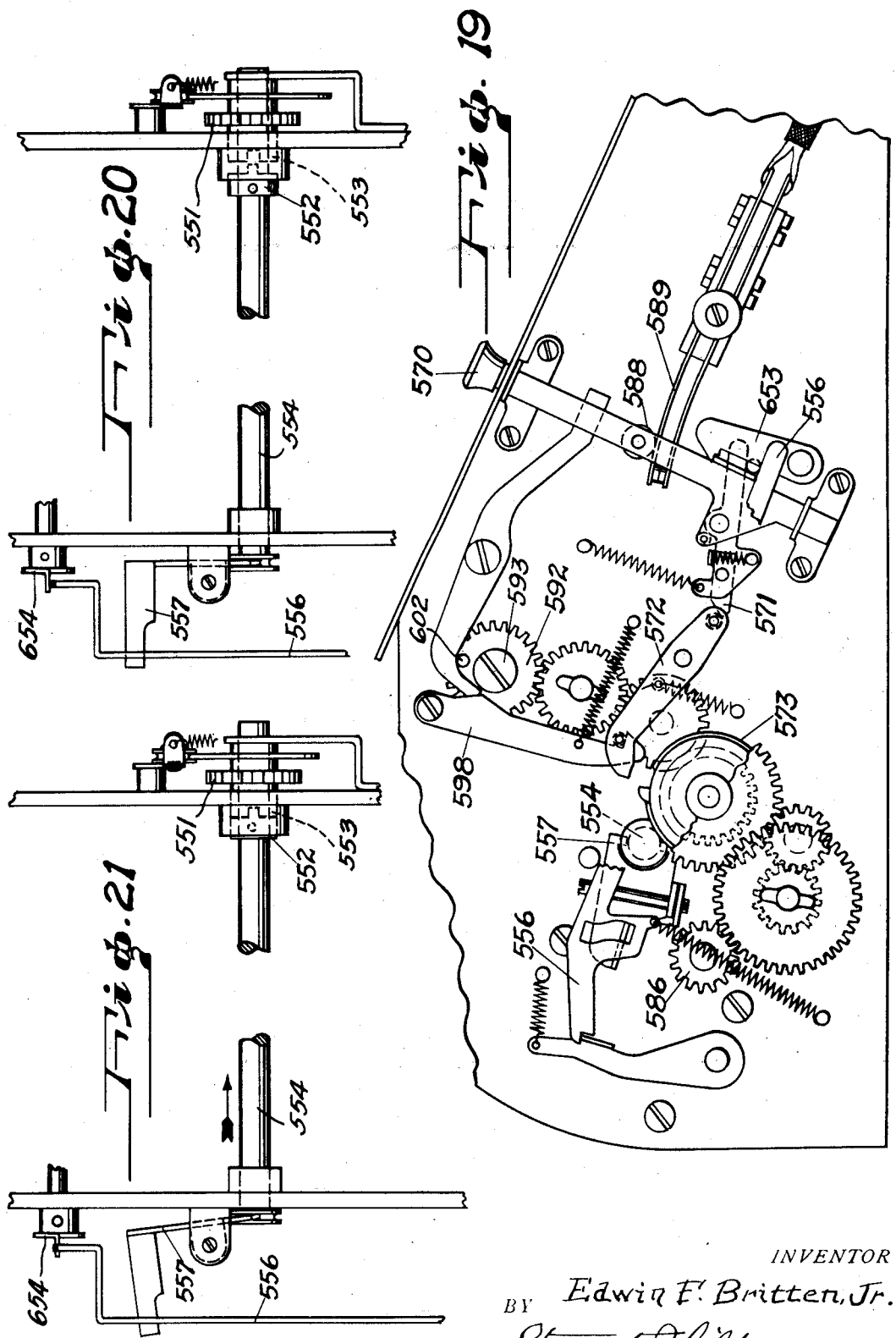

June 13, 1933.　　　E. F. BRITTEN, JR　　　1,913,973
CALCULATING MACHINE
Filed Sept. 29, 1931　　20 Sheets-Sheet 11

INVENTOR
Edwin F. Britten, Jr.
BY
Stuart Wilder ATTORNEY

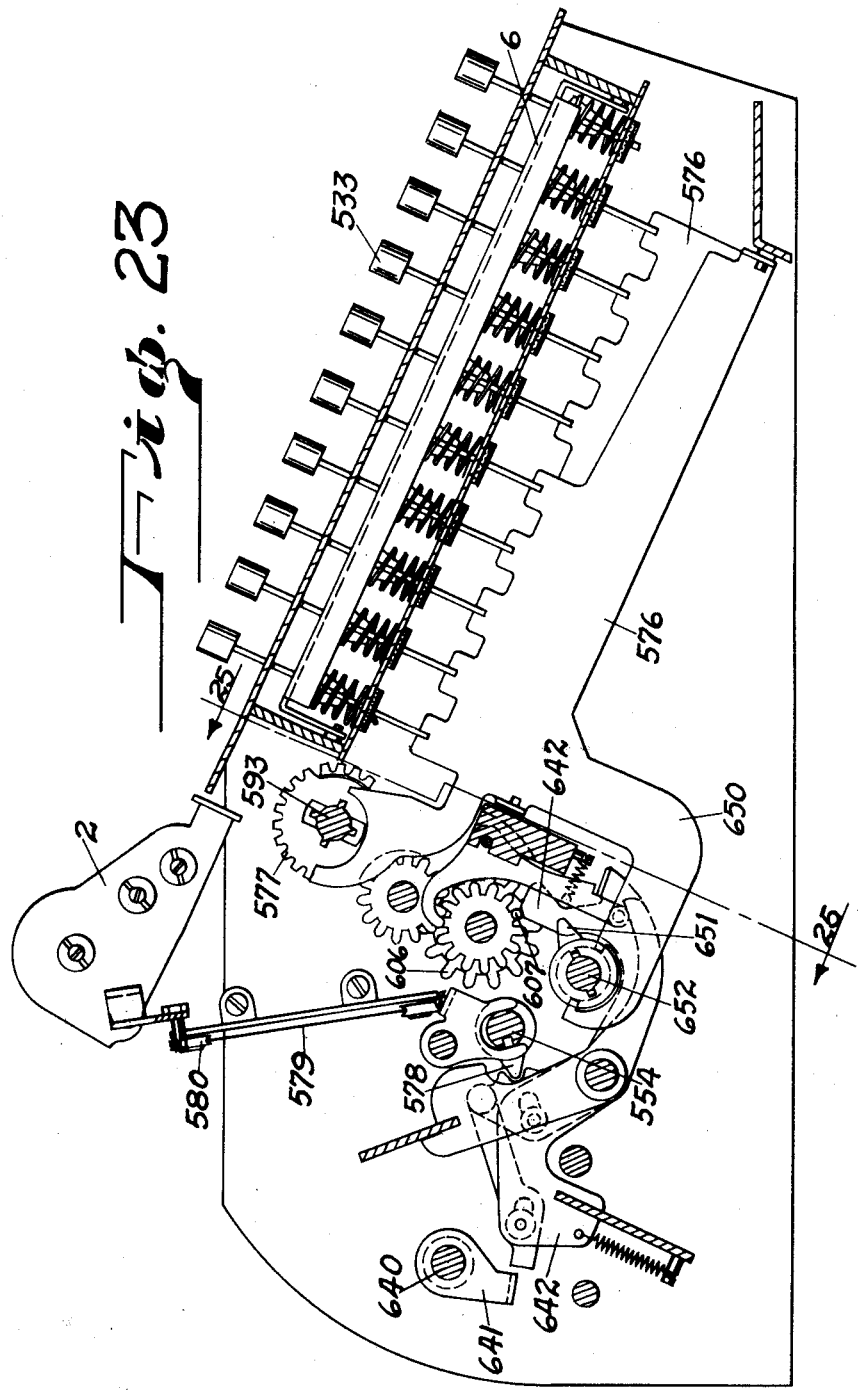

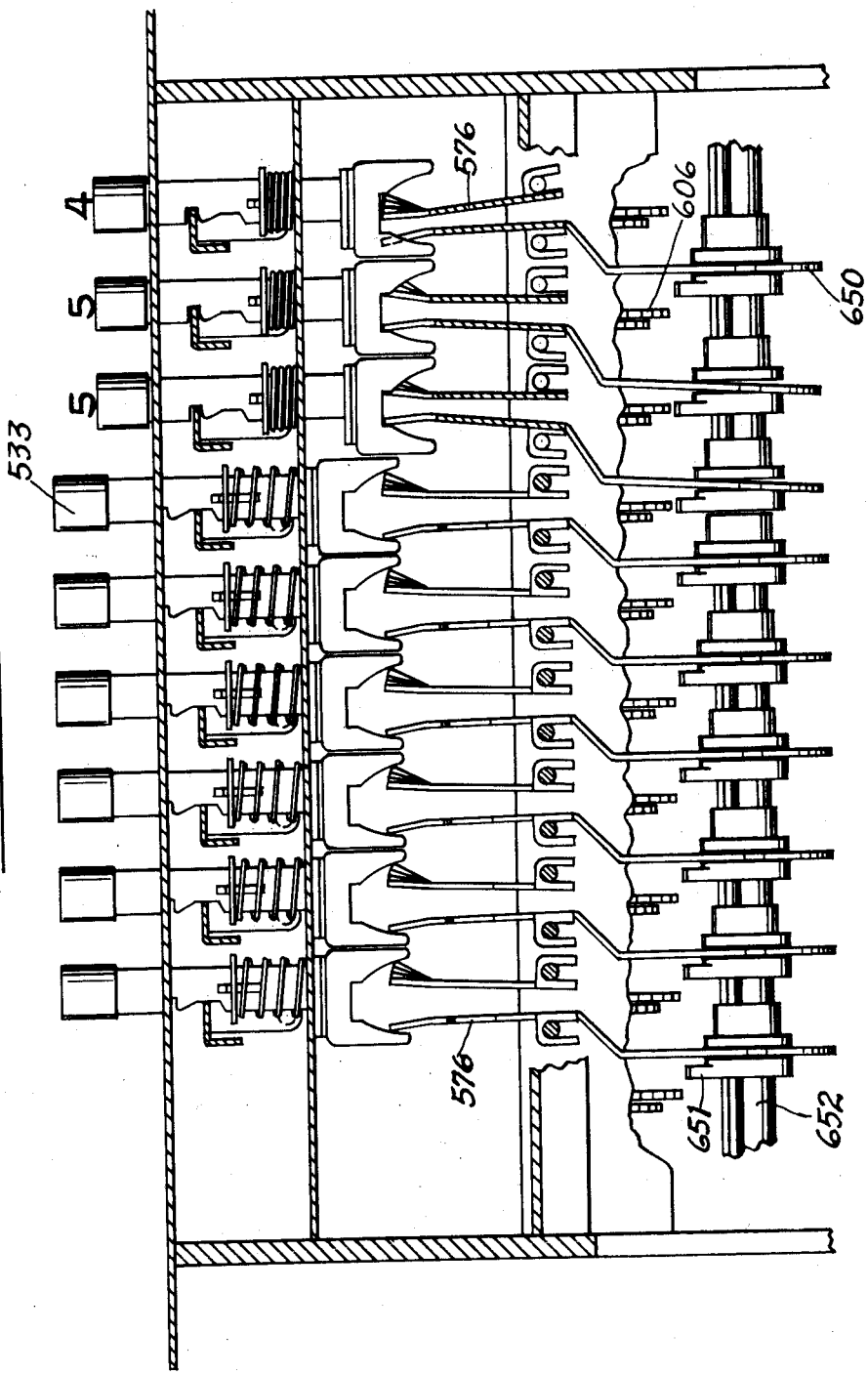

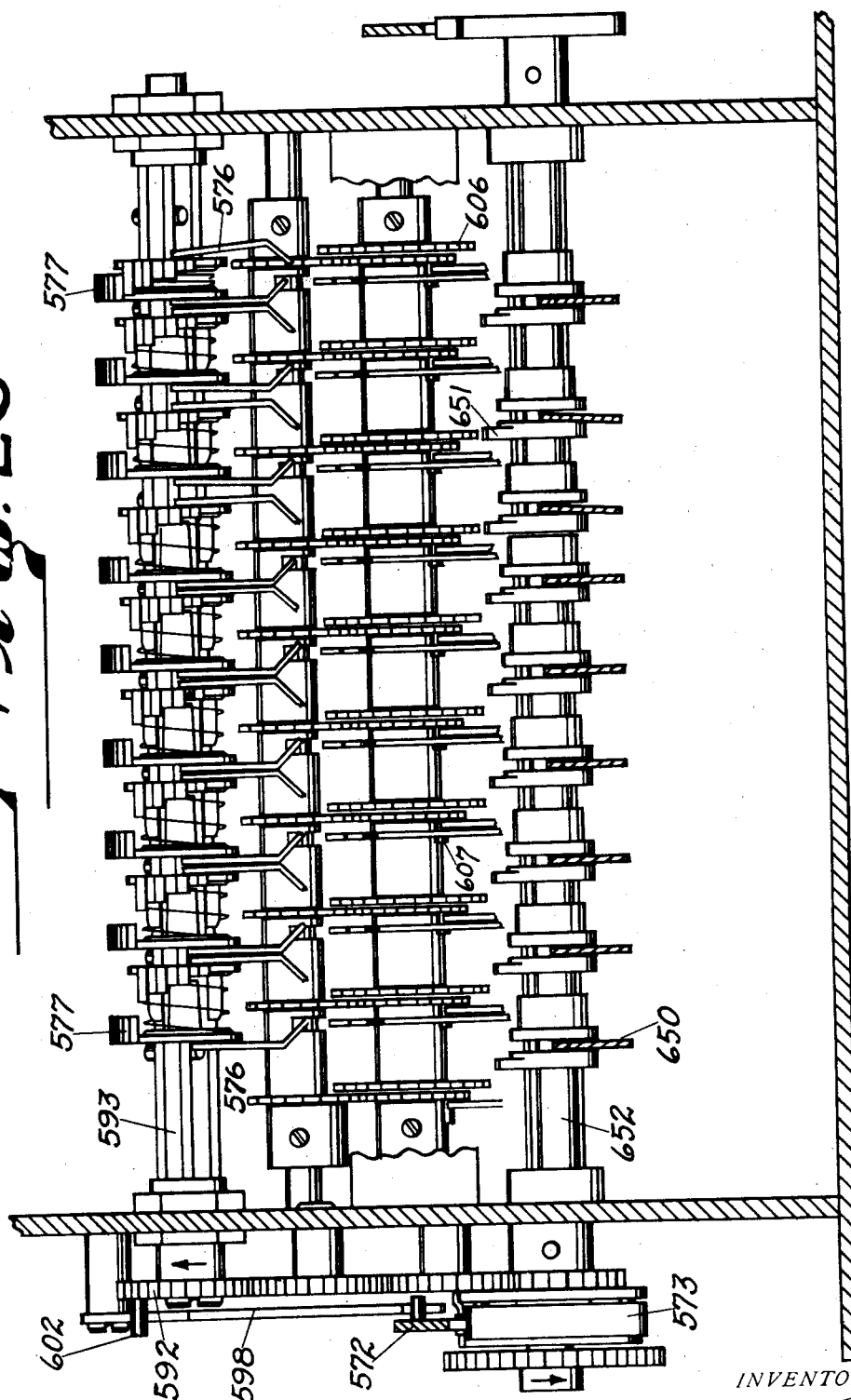

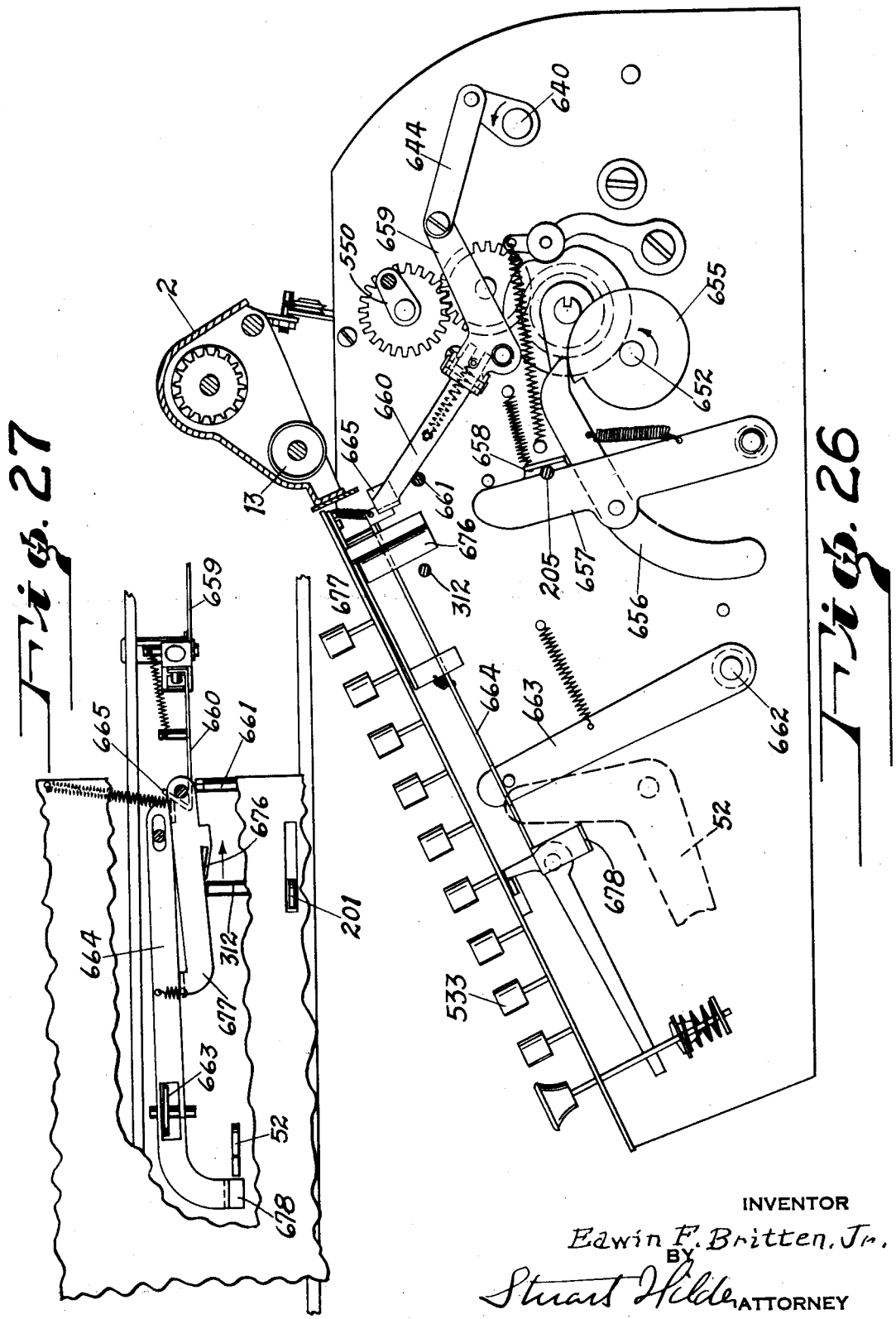

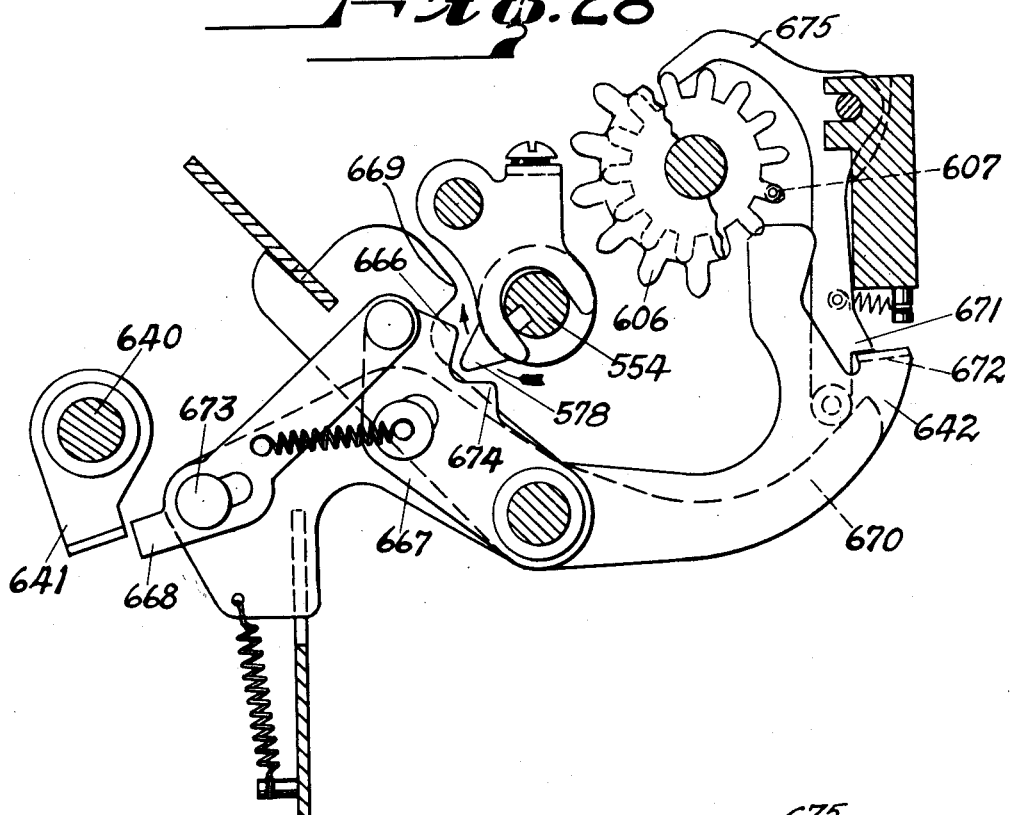
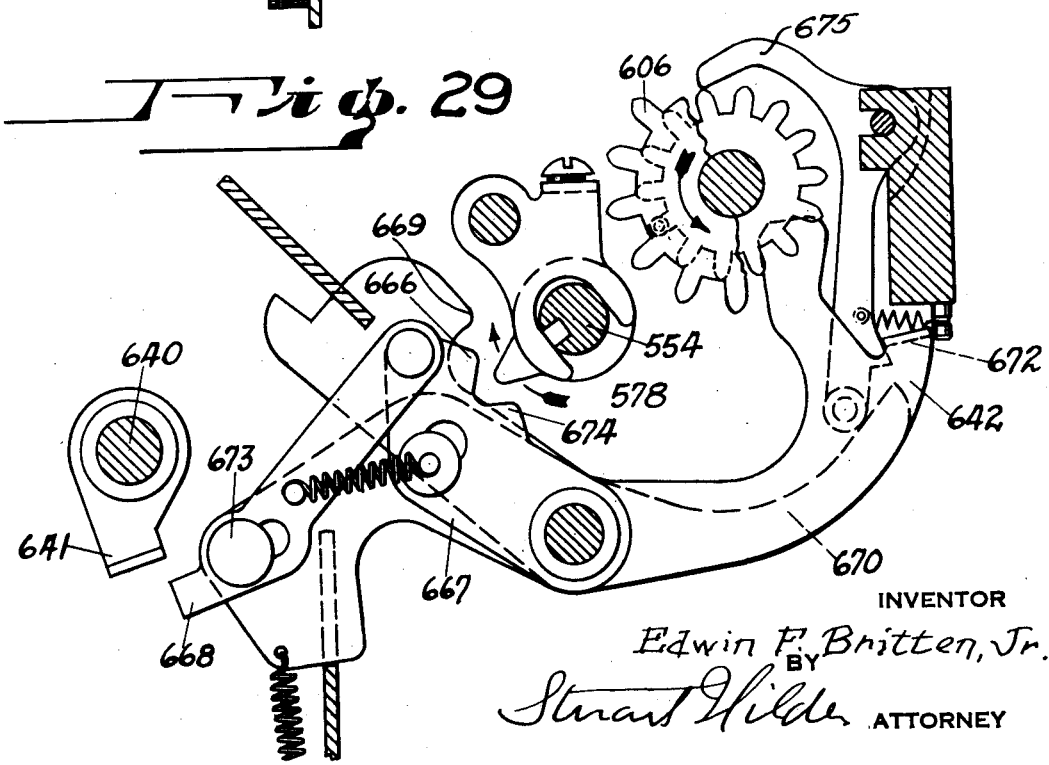

June 13, 1933.   E. F. BRITTEN, JR   1,913,973
CALCULATING MACHINE
Filed Sept. 29, 1931   20 Sheets-Sheet 17

INVENTOR
Edwin F. Britten, Jr.
BY
Stuart Wilde, ATTORNEY

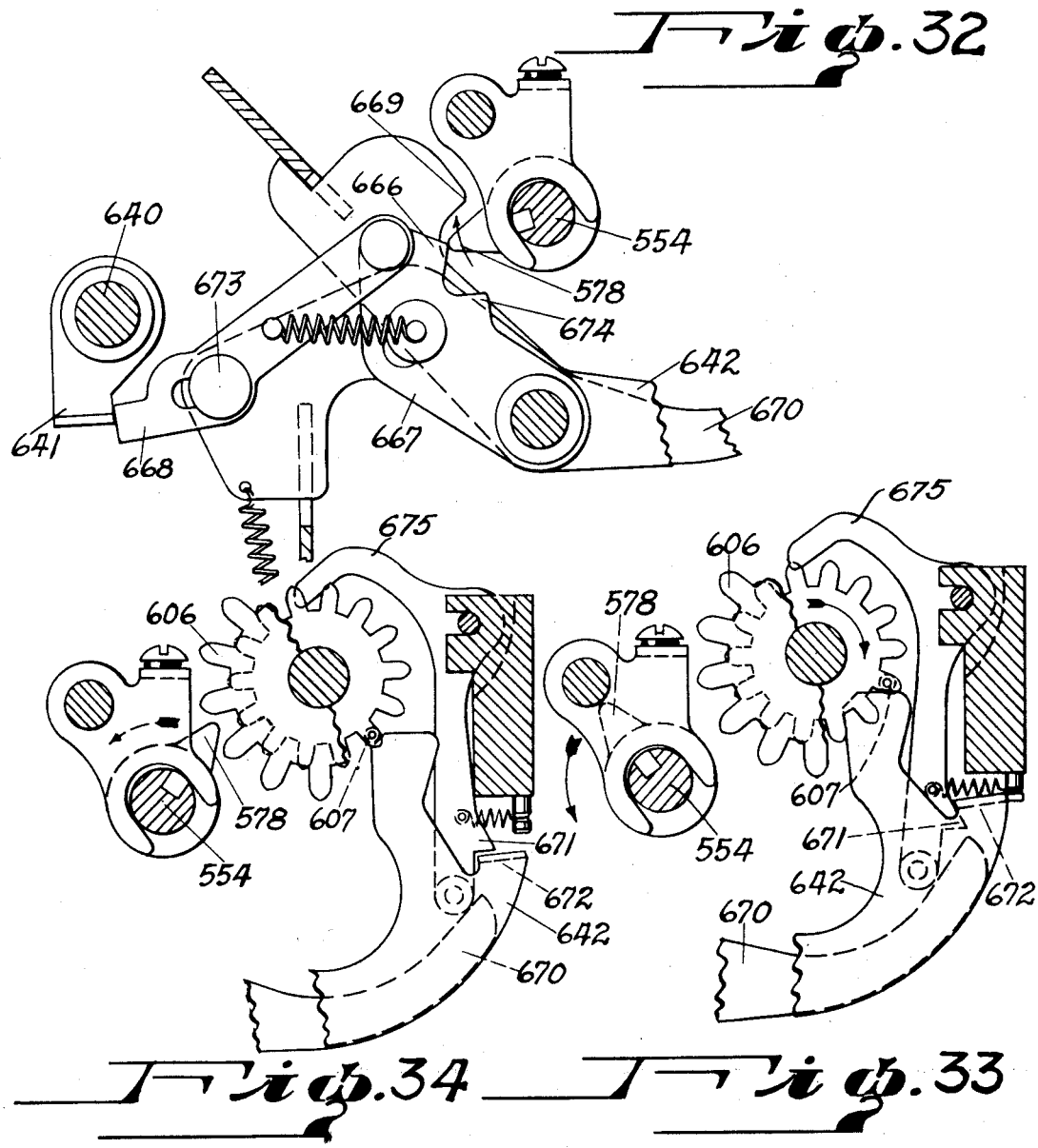
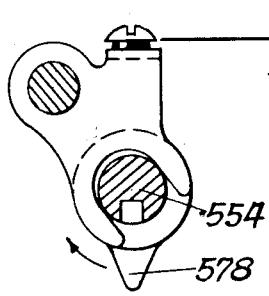

June 13, 1933.  E. F. BRITTEN, JR  1,913,973
CALCULATING MACHINE
Filed Sept. 29, 1931   20 Sheets-Sheet 19
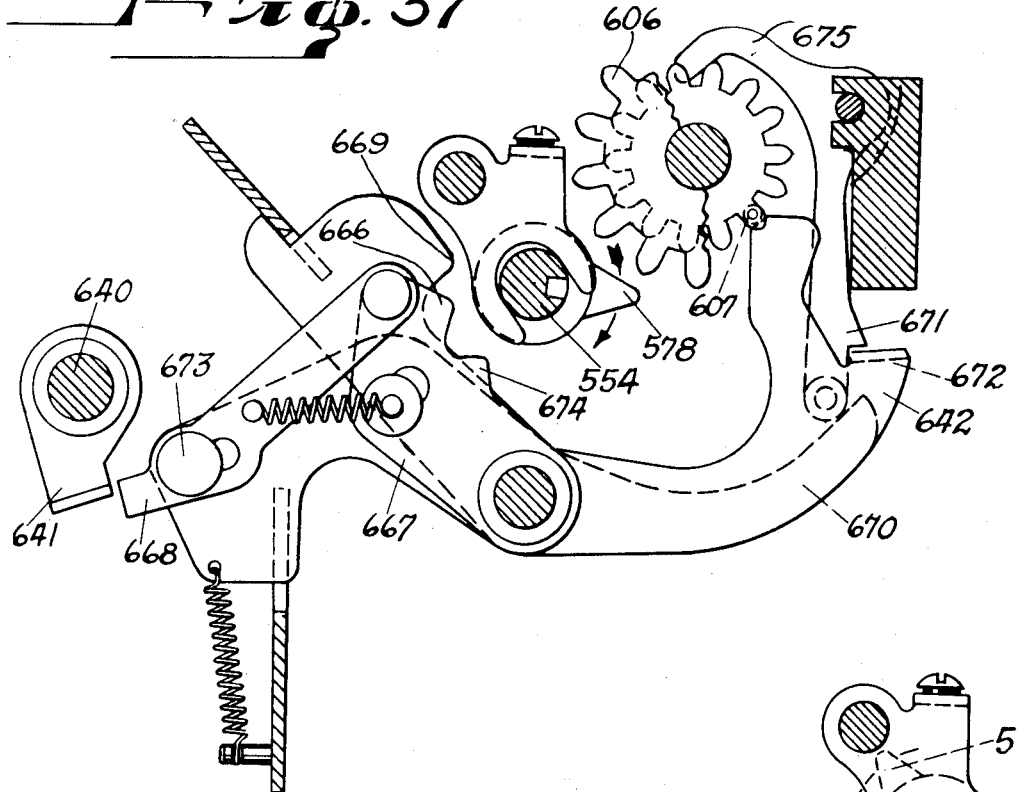
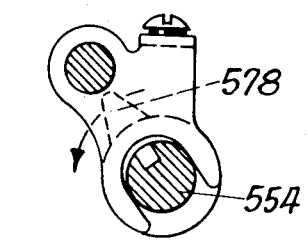
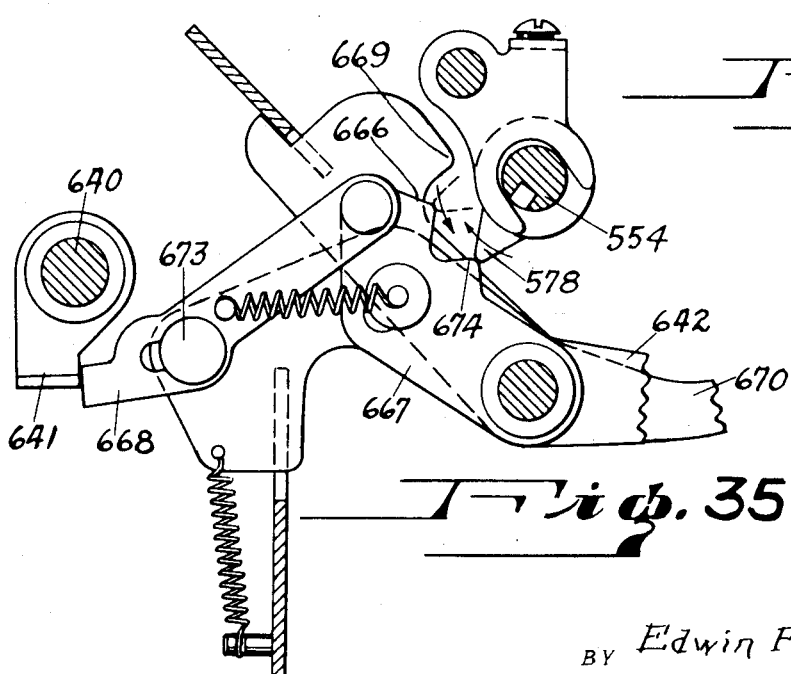
INVENTOR
Edwin F. Britten, Jr.
BY Stuart Hild ATTORNEY

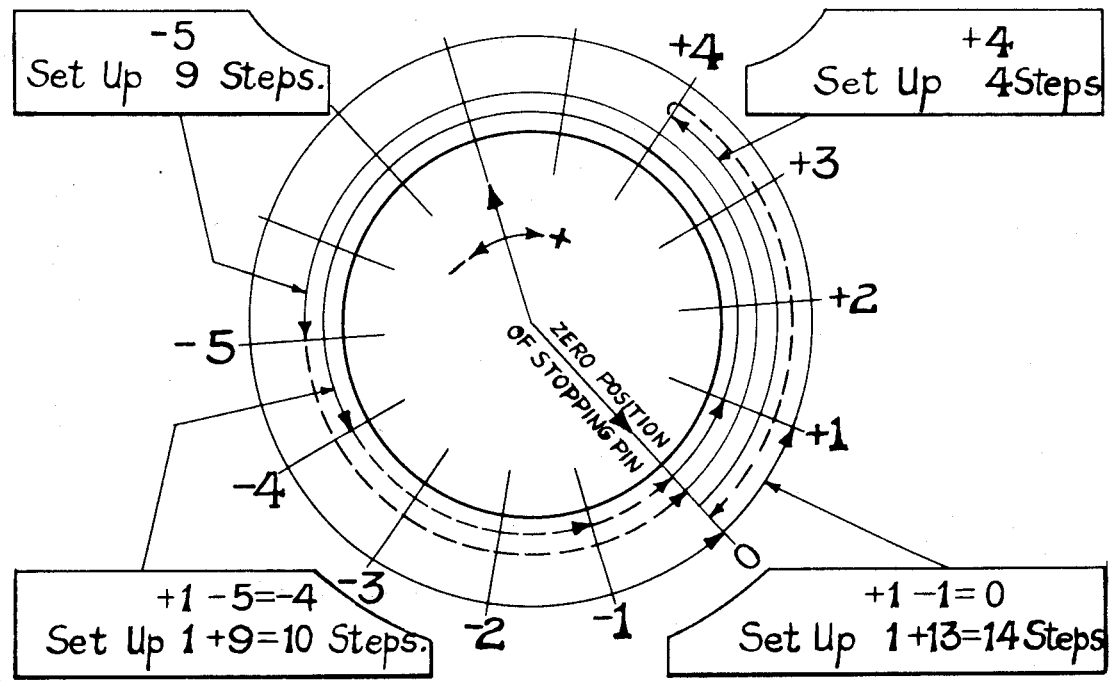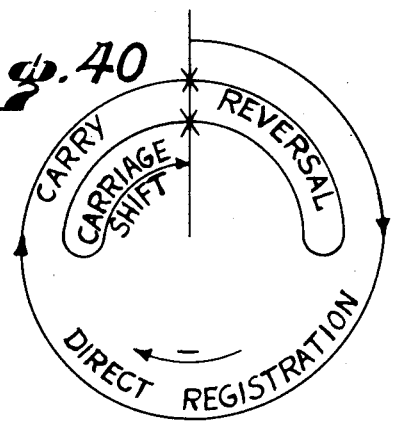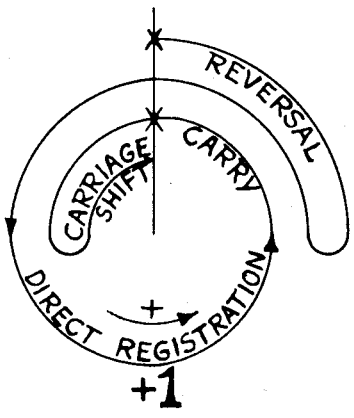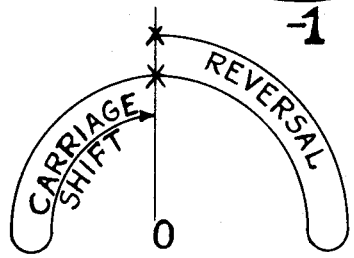
INVENTOR
Edwin F. Britten, Jr.
BY Stuart Wilder ATTORNEY Patented June 13, 1933

1,913,973

UNITED STATES PATENT OFFICE

EDWIN F. BRITTEN, JR., OF MAPLEWOOD, NEW JERSEY, ASSIGNOR TO MONROE CALCULATING MACHINE COMPANY, OF ORANGE, NEW JERSEY, A CORPORATION OF DELAWARE

CALCULATING MACHINE

Application filed September 29, 1931. Serial No. 565,737.

The invention relates to calculating machines, and more particularly to means for performing multiplication automatically upon entering the factors and starting the machine in operation.

The method of multiplication employed is that of repeated addition, modified by the well-known use of subtraction to effect short cuts; means for automatically effecting such short cut operation being shown in U. S. Patent No. 1,409,575 issued on March 14, 1922, to Alexander Rechnitzer. According to the disclosure of this patent, multiplcation by 9, for instance, is effected by adding the multiplicand once in the next higher denominational order and subtracting once in the order being computed. Also, if an addition and one or more subtractions are both indicated for any one denominational order, the number of subtractions performed will be reduced by one and the addition will be eliminated.

The present invention provides a greatly simplified mechanism for effecting the above-noted results, and it consists in the novel construction and combination of parts, as set forth in the appended claims.

In the accompanying drawings, illustrating the invention:

Figure 1 is a plan view of a calculating machine embodying the invention.

Figure 2 is a section, taken on line 2—2 of Figure 1, with the parts shown in normal position.

Figure 3 is a detail plan view of the carriage shift clutch mechanism, with the parts shown in normal position.

Figure 4 is a view similar to Figure 2, with the parts shown in position assumed when a multiplier has been set up.

Figure 5 is a view similar to Figure 3, with the parts shown in position assumed when the automatic control operation lever is in active position.

Figure 6 is a detail side elevation of the reversing mechanism, in position assumed in reversing from subtractive rotation.

Figure 7 is a similar view, showing the parts in position assumed upon completion of reversal to additive rotation.

Figure 8 is a similar view, showing the parts in position assumed in reversing from additive rotation and in shifting the numeral wheel carriage.

Figure 9 is a detail front elevation of the carriage shifting mechanism, in normal position.

Figure 10 is a similar view, the parts being shown in position assumed during a shifting operation.

Figure 11 is a detail side elevation of the mechanism for automatically terminating an operation, shown in position assumed when the numeral wheel carriage arrives in extreme shifted position.

Figure 12 is a similar view, showing the same and cooperating parts in position assumed upon retraction of the automatic operation control lever.

Figure 13 is a detail side elevation of the automatic control mechanism, showing the parts in position assumed upon retraction of the reversing tooth.

Figure 15 is a rear elevation of the multiplier section of the machine.

Figure 16 is a left side elevation of the machine, with casing removed.

Figure 17 is a detail side elevation of the multiplier installing clutch.

Figure 18 is a section, taken on line 18—18 of Figure 17, the parts being shown in normal position.

Figure 19 is a view similar to Figure 16, showing the parts in position assumed upon depression of the starting key.

Figure 20 is a detail plan view of the multiplier coupling control members, in normal position.

Figure 21 is a similar view, showing the parts in coupled position.

Figure 23 is a section, taken on line 23—23 of Figure 1.

Figure 24 is a section taken on line 24—24 of Figure 1, showing a multiplier of 554 set on the keys.

Figure 25 is a section, taken on line 25—25 of Figure 23, showing the same multiplier setting.

Figure 26 is a section, taken on line 26—26 of Figure 1.

Figure 27 is a detail plan view of parts shown in Figure 26.

Figures 28, 29, 30 and 31 are detail elevations of the parts in which the multiplier is installed, showing the parts related to the thousandths, hundredths, tens and units columns respectively, when a multiplier value of 550 is installed.

Figure 14:
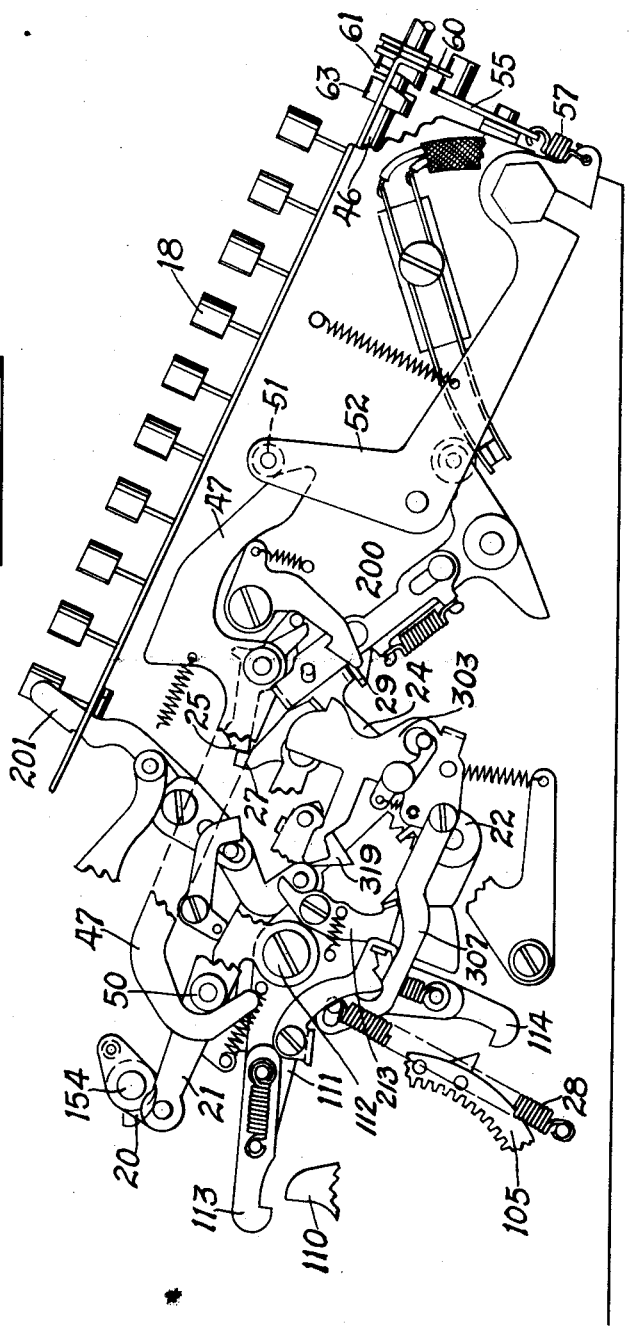
Figure 14 is a similar view, showing the parts in position assumed upon release of the locking arm.

Figures 32 to 38, inclusive are similar views, showing the parts in positions successively assumed during a multiplying operation.

Figure 39 is a diagram illustrating the installation and registration of various multiplier units.

Figures 40, 41 and 42 are diagrams illustrating the movements of the register actuators in registering −1, +1 and 0, respectively.

The invention is shown as applied to a Monroe calculating machine, the essential features of which are disclosed in U. S. Patent No. 1,566,650, issued to George C. Chase on December 22, 1925, and in application Serial No. 79,811, filed by the same inventor on January 7, 1926, and issued Nov. 15, 1932 as Patent No. 1,888,161. Certain features of application Serial No. 538,941, filed by Edward C. Walter on May 21, 1931, are also utilized herein.

Driving and stopping

According to the above-noted disclosures, amounts set up on the multiplicand keyboard 18 (Fig. 1) are registered upon the product wheels 13 either additively or subtractively, according to the direction of rotation imparted to the well-known register actuating and tens carry mechanism. This mechanism is driven from an electric motor, connected to the actuator and carry shafts through differential reversing gearing shown in Figs. 2 and 4. Normally this gearing runs free, and no rotation is transmitted to the actuators, but upon engagement of arm 114 of clutch lever 111 (fulcrumed at 112) with gear member 105, additive operation of the machine will result, while upon engagement of arm 113 of said lever with member 110, subtractive operation will result, through reverse rotation of the actuators.

The details of the above mechanism are fully disclosed in Patent No. 1,566,650, which also (together with application No. 79,811), shows means for controlling the duration of a registration so initiated, by means of a mechanism governing the reversal of the actuators, to change the sign character of the registration; the shifting of the register wheel carriage 2 to the next denominational place, or the stopping of the actuator movement, according to the adjustment of supplemental control devices.

The above-mentioned control mechanism functions as follows in stopping the machine:

On the end of the tens carry shaft 154 (which has direct gear connection with the differential actuator shaft) is a crank arm 20 (Figs. 6, 7, 8), having link connection 21 with a rock lever 22, the latter thus oscillating constantly during the rotation of the register actuators. A rocker 24, pivoted upon the fulcrum of rock lever 22, is provided with a pawl 25, normally held out of the path of movement of lever 22 by engagement of a lug of said pawl with the end of a pivoted trigger 31, through the action of the return spring 28 of rocker 24. Upon operation of trigger 31, however, pawl 25 will fall into the path of a shoulder 27 of rock lever 22, and rocker 24, moving in unison with said lever, will be brought into contact with a stop 29, fixed to the machine frame. During this movement of rocker 24, an arm 144 of said rocker will rise, and a pin 145 of clutch lever 111 will be engaged by a cam face of said arm and the clutch lever moved to its central or neutral position, as shown in Fig. 6. Upon rebound of the parts from stop 29, assisted by spring 28, pawl 25 will engage the end of trigger 31, and will be lifted out of engagement with shoulder 27, the parts now being restored to normal position, with the machine at rest.

The engagement of pawl 25 with shoulder 27 occurs just after the register actuators pass through their full-cycle position, and the actuators are arrested, by engagement of rocker 24 with stop 29, before they have moved out of the zone of idle movement which occurs during the first part of each cycle, in reversible cycle calculating machines.

Automatic reversal

Engagement of the clutch, automatic reversal of the actuator drive and automatic shifting of the register carriage is controlled by mechanism set into active position upon movement of a control lever 201 (Figs. 2, 4, 6, 11, 12, 13). Lever 201 is manually set to active position for accomplishing division, according to the method described in application No. 79,811, hereinbefore referred to, and is automatically thrown to said active position by the multiplier mechanism later described. The operation of the parts controlled by this lever (except as modified by the multiplier devices) is as follows:

Forward movement of the lower end of lever 201 about fulcrum 202 will bring a pin 205 of said lever against a cam arm of a lever 303 (Figs. 2 and 4), rocking the latter and bringing a second cam arm thereof into contact with a pin in lock lever 200, whereby lever 200 will be lifted out of engagement with rock arm 22 and held in disengaged position. This will leave the machine free for registering operation.

Continued forward movement of pin 205 will cause engagement of the same with a click pawl 319, carried by a lever 208, fulcrumed at 112 the pawl and lever moving in unison to bring a pin 219 of the lever 208 against clutch lever 111, to rock the latter into subtractive clutch position, as shown in Fig. 4.

The engagement of pin 219 with clutch lever 111 is not direct, since the pin contacts with a reversing member 209, pivoted upon lever 111, giving said member a slight pivotal displacement before movement is transmitted to the clutch lever. Reversing member 209 is latched in displaced position by spring latch 213, with a tooth 211 of said member advanced toward a tooth 220, fast upon shaft 154.

With the parts set in this position, the machine will continue to operate subtractively until trigger 31 is tripped, whereupon rocker 24 will be carried against the stop 29 (Fig. 6) and arm 144 will disengage the clutch. The rocking of clutch lever 111 to its central position will bring the advanced tooth 211 into the path of movement of tooth 220, since reversing member 209 remains rigidly latched to the clutch lever, so that tooth 220 contacting with tooth 211 as the parts rebound toward full-cycle position, will throw the clutch lever into additive clutch position (Fig. 7). Therefore, lock lever 200 still being held inoperative, the direction of rotation of the actuators will be reversed and the machine will continue in additive operation until trigger 31 is again tripped.

With control lever 201 set to active position, tripping of trigger 31 during additive registration will reverse the direction of rotation of the actuators in the same manner as they are reversed from subtraction, tooth 220 now rotating oppositely and therefore throwing clutch lever oppositely from its neutral position, into subtractive clutch position.

*Carriage shifting*

During each reversal from additive to subtractive rotation the register carriage 2 will be shifted to the next lower denominational order, to change the value of the next multiplier registration in the well-known manner.

The shifting is effected through the movement of rocker 24 upon which is pivotally mounted a push rod 47 (Figs. 2 and 8), having a rear-end engaged by a pin 50 of link 21 as crank arm 20 sweeps upward (in additive rotation) from the full-cycle position (Fig. 8). Thus held by pin 50, the forward end of rod 47 will contact with a roller 51, mounted on bell-crank lever 52, rocking said lever and thereby, through connection 57 (Figs. 4, 5, 9 and 10) moving lever 55, cam 60, clutch hub 61 of said cam, clutch member 63 on shifting shaft 46 and crank pin 64 of said shaft, to raise carriage 2 and move it one space to the left.

This carriage shifting mechanism is placed in operative condition upon movement of control lever 201 to active position, by means of a spring actuated bar 217 (Figs. 3, 5 and 9), engaging lever 201 and provided with a shifting yoke embracing the member 60, 61, so that as lever 201 is moved forwardly, clutch hub 61 will be engaged with clutch member 63.

*Stopping the machine*

The machine will still continue to operate until the control lever 201 is retracted, either manually or automatically upon arrival of register carriage 2 in extreme left-hand position. In either case, the control lever having been retracted, the machine will continue to operate until trigger 31 is tripped during an additive registration (enabling the last place computation to be completed), whereupon it will be brought to rest.

Movement of the carriage into extreme left-hand position brings a pin 198 mounted on the carriage into contact with a spring supported arm 223 (Fig. 2), pivoted upon the stationary frame, depressing said arm and thereby depressing an arm 311, pivoted to control lever 201, arms 223 and 311 having suitable pin and slot connection. Depression of arm 311 brings a face 313 thereof into the path of movement of a snail cam tooth 314, fast upon shaft 154 so that upon approximately the first quarter cycle of subtractive rotation of said shaft (Fig. 11) tooth 314 will operate, through arm 311, to push control lever 201 back to inoperative position (Fig. 12).

When control lever 201 is retracted during subtractive rotation of the parts (as is always the case in automatic restoration), reversing member 209 and lock lever latch 303 remain in active position so that the machine will continue to subtract until trigger 31 is tripped, whereupon it will reverse and continue to run in additive direction. However, during this reversal, as clutch lever 111 is thrown into additive clutch position, latch 213, mounted on said lever, will contact with the retracted pin 205 of the control lever (Fig. 13), and will be moved to release reversing member 209, which will be retracted by its spring. Therefore, when trigger 31 is next tripped (during an additive operation), reversing member 209 will not function, and clutch lever 111 will be left in neutral position, as moved by arm 144. This movement of arm 144 will also retract lock lever latch 303, by means of a lever 307 (Figs. 2 and 8) connecting said arm and the latch, the lever being raised by arm 144 (Fig. 14) and taking a fulcrum upon the retracted reversing member latch 213 to move latch 303 to inactive position. Lock lever 200 will now fall upon rock lever 22, and, as the actuators come to full-cycle position, will fall in front of said lever and hold the actuators at rest. Obviously, retraction of the control lever 201 will release the clutch 61, 63, so that no carriage shifting impulse will be transmitted in the final action of rocker 24 involved in the above-described operation.

Setting the multiplier

All of the above-described mechanisms, which correspond in essentials to the disclosures hereinbefore referred to, are utilized, in connection with the novel multiplier control mechanism hereinafter described, to attain the objects of the present invention. Before describing the cooperating action of the multiplier control mechanism, however, it will be necessary to explain the manner in which a multiplier is set and installed in such control mechanism.

Figure 22:
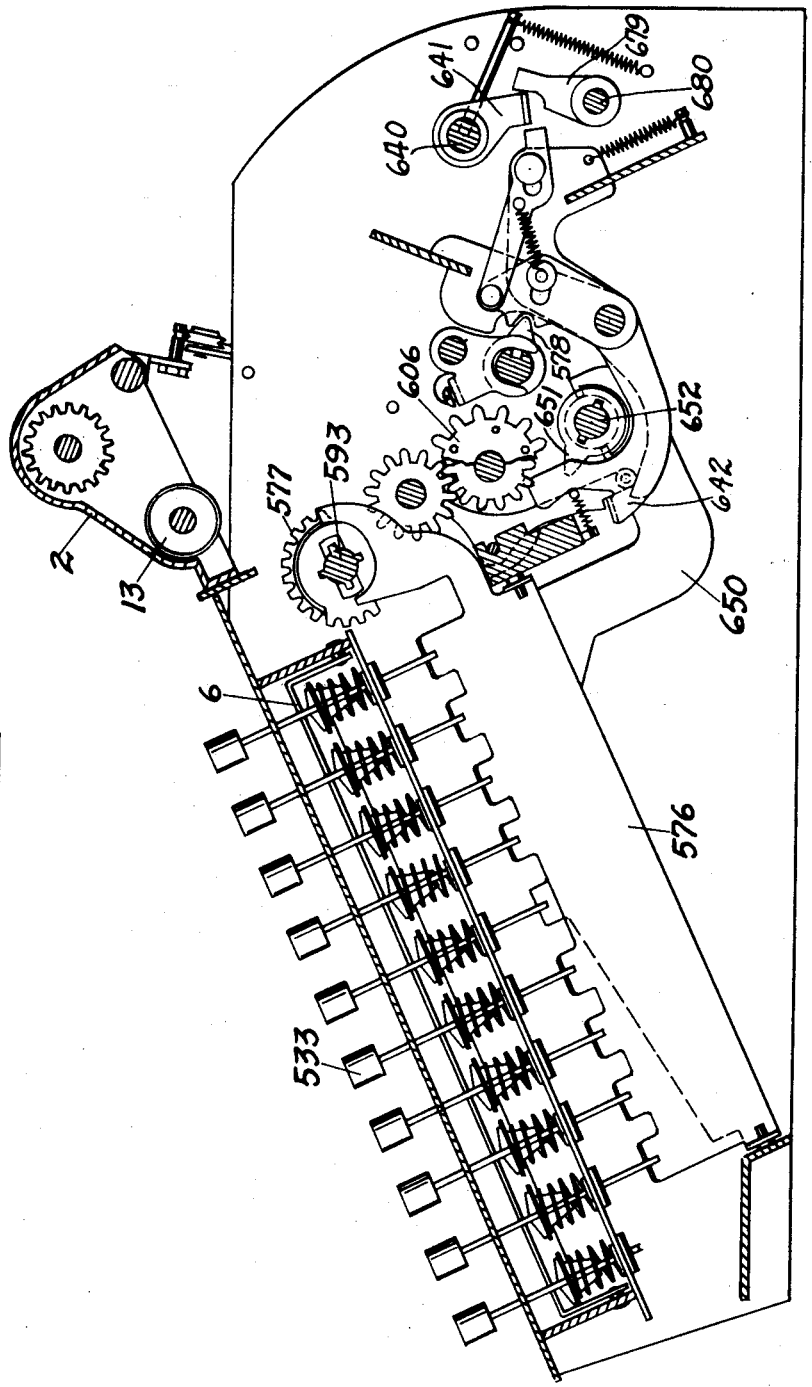
Figure 22 is a section, taken on line 22—22 of Figure 1.

The multiplier is set by the depression of the appropriate keys 533 (Figs. 1, 22, 23) in the respective denominational columns of the multiplier keyboard, the keys being latched in depressed position by the usual bails 6 engaging notches of the key stems. The bottoms of the key stems engage lugs of selector bails 576 of the known Monroe type, the two bails related to each column of keys engaging each an element of a two-part selector gear 577, slidably keyed upon a shaft 593, so that either or both of said elements may be set into the plane of an intermediate gear, meshing with the corresponding gear 606 of a control mechanism in which the multiplier is to be installed. All of this is in general accordance with the disclosure of application No. 538,941, hereinbefore referred to, although, as will be seen, the numbers of teeth of the selector gears 577 set in active position by a given key is not the same.

The right-hand bail of each pair is adapted to set its gear element 577 to bring one, two, three or four of the graded teeth of said element into the plane of the intermediate gear, while, in the example shown, the left-hand bail is adapted to bring the nine teeth of its gear element into such plane. As will be seen, this latter number is arbitrary, depending upon the number of teeth in the control gear 606. Each left-hand bail 576 is also provided with an extension 650, adapted when the bail is rocked by a key to shift a single-tooth member 651, slidably keyed to a shaft 652, into the plane of the control gear 606 of next higher denominational order (Fig. 24).

The lugs of bails 576 are so arranged that the 1, 2, 3 and 4 keys will set 1, 2, 3 and 4 teeth, respectively, of the selector gears 577 to active position, while the 5, 6, 7, 8 and 9 keys will set the member 651 in the higher order column and will set 9, 10, 11, 12 and 13 teeth, respectively, of the related pair of selector gears 577 to active position.

Installing the multiplier

The multiplicand having been set on keys 18 and the multiplier on keys 533, the machine is put in operation by depression of a key 570 (Figs. 16 and 19), the first effect of which is to install the multiplier, set on selector gears 577 and members 651, in the control gears 606.

To this end, the stem of key 570 is provided with a roller 588 of insulating material, which in the depression of the key effects contact of a switch 589 interposed in the circuit of the electric motor. The lead to this switch is arranged in parallel with a second lead which is extended to a switch governed by the locking lever 200, previously referred to, so that closing of either of these switches wil complete the circuit through the motor and start the motor and drive shafts in operation.

The motor shaft has an extension provided with a gear 586, having gear connection with a clutch 573 (Fig. 18), the driven member of which is fast upon the shaft 652 of the members 651, said driven member also having gear connection 592 with the shaft 593 of the selector gears 577. Key 570 has a click tooth 571 adapted in the depression of the key (Fig. 19) to operate the clutch lever 572, to release the installing clutch 573, lever 572 being momentarily held out of contact with the clutch by a latch 598, released by a pin 602 in gear 592.

Clutch 573, illustrated in Figs. 17 and 18, is of well-known construction, release by lever 572 permitting the clutch spring to effect contact of a pawl with the opposed surface of the clutch assembly until said lever is struck by the clutch pawl, at the end of the cycle, whereupon the clutch is released.

Thus, shafts 593 and 652 are given a single cycle of operation and are then brought to rest, and each control gear is advanced a number of tooth spaces corresponding to the set teeth of the related selector gears 577 and member 652.

In order that no further operation of the installing mechanism may be effected during the registering operation of the machine, key 570 is latched in depressed position by an arm 653 having a shouldered head, engageable with a lug of the key.

The control gears 606, having been set up by rotation in a given direction, are intended to be returned to normal position, during additive registration, by rotation in the opposite direction, as shown in the diagram, Fig. 39, wherein the solid lines represent the setting movement and the dotted lines represent movement of the gears during registering operations. Subtractive registrations, as therein shown, result in return of the gears 606 to normal by rotation in the same direction in which they are set. Setting for addition, therefore, is accomplished by setting gear 606 ahead the desired number of steps, while for subtraction the gear is set ahead complementally, so that it stands the required number of steps from zero position, suitable reverse rotation means being also set, as hereinafter described. It is to be noted that where both an addition and a subtraction have been set on the same gear, they will automatically cancel each other. It may also be noted that the number of teeth upon gear 606 is immaterial, so long as the subtractive selector gears 577 are correspondingly proportioned.

Registering the product

A master member or feeding tooth 578 (Figs. 15 and 23) is slidably keyed to shaft 554, said member being moved along the line of gears 606, from order to order, during the operation of the machine, by means of a cable 579, secured thereto and to register carriage 2 and passing over pulleys 580. Tooth 578 feeds the control gears 606, step by step, backward or forward to normal or zero position and thereby, through control pins 607 of said gears and the cooperating mechanism, determines the number of additive or subtractive registrations to be made in each denominational order.

Shaft 554 is connected to the drive of the register actuators by means of a clutch member 552 (Figs. 15, 20, 21), fast to the shaft and engageable by endwise movement of the shaft with a clutch member 553, fast with a gear 551 operatively connected with a crank 550, engaging the pin of crank arm 20 (Figs. 15 and 26). Shaft 554 is shifted, to engage the clutch 552, 553, by a cam lever 556, engaged by key 570 (Fig. 16) and engaging a bell-crank lever 557 having an arm registering with an anular groove of shaft 554. A latch 654 holds clutch 552, 553 in engaged position.

The registering operation is started by means of a single toothed disk 655 (Fig. 26) fast upon shaft 652, which it will be recalled, is fast to the driven member of clutch 573. Just before clutch 573 is released, the tooth of disk 655 will engage a pawl 656 of lever 657, rocking said lever and, through lug 658, forcing pin 205 of control lever 201 forward, so that the control lever is set to active position.

The successive registrations are regulated solely by tripping of trigger 31, whereby the direction of actuator rotation and the automatic shifting of the register carriage are controlled By reference to the preceding description of the reversing and carriage shifting mechanism, and to the diagrams, Figs. 40, 41 and 42, the method of controlling the multiplier may be understood, it being remembered that tripping of trigger 31 allows movement of the actuators through a non-registering zone of the following cycle and reverses the rotation, and that a reversal during additive operation is accompanied by a carriage shift. Figure 40 represents the actuator movement during a subtractive registration of one, wherein at the end of the cycle of movement, the trigger is tripped (at point X) and the actuators are checked and reversed, after which the trigger is again tripped and a shift of the register carriage and reversal to subtractive rotation will occur. In Fig. 41 it is seen that in order to register additively, the trigger is tripped at the beginning of the operation, whereby the rotation will become additive, and that no reversal is necessary before the carriage shifting operation. Figure 42 shows how, by a third combination of timed trigger actions, the register carriage may be shifted without operative movement of the actuators, the latter being twice reversed while moving through a non-registering zone.

The trigger is controlled by pin 607, fast upon gear 606, this pin, as more fully explained hereinafter, governing the position of a lever 642 (Figs. 22, 23), adapted to make and break an operative connection between the tooth 578 and an arm 641 of rock shaft 640. A link 644 (Fig. 26) connects a crank arm of rock shaft 640 with a lever 659, having a pivoted arm 660 adapted to overlie a pin 661, fast in a depending arm of trigger 31. Thus, rocking of shaft 640 will move arm 660 against pin 661 and trip the trigger. When the key 570 is depressed, the pivoted arm 660 is positioned over pin 661 in the latching movement of arm 653, this movement rocking shaft 662, on which arm 653 is mounted, thereby rocking arm 663 and forcing bar 664 rearward, (Fig. 27) against a cam portion 665 of arm 660, to adjust the arm. The action of the control gears on shaft 640 may best be explained in connection with a multiplier of several figures, for which purpose the different positions of the parts assumed in multiplying by 554 are illustrated in Figures 28 to 38. To complete the description of operation, the problem 554 × 6247 will be taken.

Assuming that 554 has been set on the keys 533 as shown in Figure 24, the three settings are to be combined, in accordance with the short cut operation system hereinbefore referred to, as follows:

```
  ×5  = +1−5         registering cycles
  × 5 =    +1−5      registering cycles
  ×  4=        +4    registering cycles
  ×554= +1−4−5+4     registering cycles
```

The carriage 2 is placed in the thousands position, bringing tooth 578 into line with the gear 606 immediately to the left of the depressed keys, and, the multiplicand having been set on the keys 18, the starting key 570 is depressed. The first figure to be computed is $+1$ and this is set in gear 606 by the tooth 651, upon rotation of shaft 652. Shaft 554 will now rotate in the direction of the arrow, Fig. 28, and tooth 578 will immediately strike a cam projection 666 of toggle 667, forcing nose 668 of said toggle against arm 641 (Fig. 32) rocking shaft 640 and tripping trigger 31 to reverse the actuators, from subtraction to addition. Tooth 578 will next strike a cam projection 669 of a trip pawl 670, which will move latch 671 away from a shoulder 672 of arm 642, said arm thereupon moving to the position illustrated in Figs. 29 and 30, carrying the guide stud 673 of toggle 667 downward and bringing nose 668 out of line with arm 641. The actuators will reverse (in response to the previously noted movement of shaft 640) when tooth 578 reaches the position illustrated in Fig. 33, from which position said tooth now rotates in the direction of the arrow, passing through gear 606 (Fig. 34) during the first registering cycle of the machine, to move the pin 607 back to zero position, this movement of the pin camming arm 642 to normal position and allowing latch 671 to fall in. This brings cam projection 674 (Fig. 35) into the path of tooth 578, and, as the parts pass through full-cycle position, toggle 667 will again be operated and trigger 31 tripped, the carriage shifted and tooth 578 returned from the position illustrated in Figure 36.

This single cycle of additive operation in the thousands position has served to register 6247000 in the wheels 13, as a partial product.

The carriage having been shifted to move the numeral wheels 13 to the left (equivalent to shifting the set keys 18 to the right), tooth 578 is now moved to the right opposite the gear 606 in the hundreds column, which, as shown in Figure 29 has been set to register $-4$. In setting the gear, pin 607 was carried past a finger 675 of latch 671, tripping said latch, so that there will be no reversal of the subtractively rotating actuators prior to the registration. Tooth 578 will therefore continue to move through gear 606 until pin 607, having been moved four steps (during four cycles of registering operation), to zero position, as shown in Fig. 37, cams arm 642 to normal latched position. Trigger 31 will now be tripped, but, because the actuators are rotating subtractively, no carriage shift will occur. After operating the toggle, tooth 578 strikes cam projection 669, but, since pin 607 holds arm 642 in normal position, the release of latch 671 is ineffectual, and upon the reverse rotation from the position of tooth 578 illustrated in Fig. 38, trigger 31 will again be tripped and the carriage shifted.

The four subtractive operations in the hundreds position of carriage 2 has given:

$$\begin{array}{r} 6247000 \\ -24988 \\ \hline 3748200 \end{array} \text{ (i.e. } 4\times 6247\text{)}$$

Figure 31:
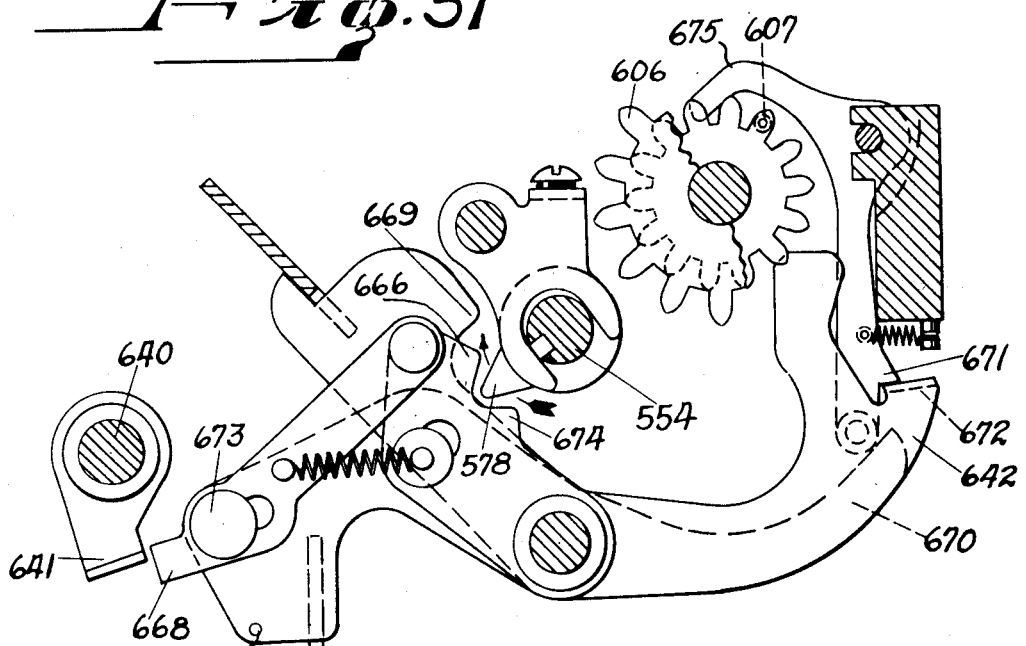
Figure 30:
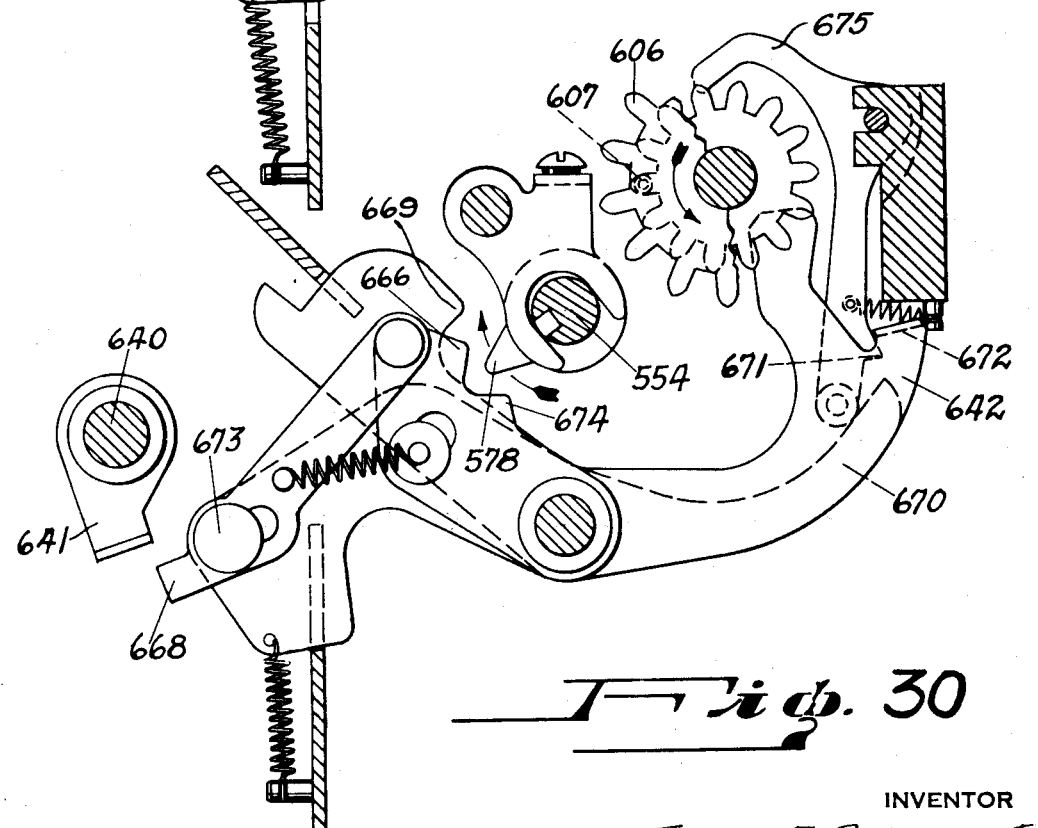

Figure 30 shows the setting in the tens column, pin 607 being five steps of subtractive movement from zero position. Figure 31 shows the units column, with pin 607 set to add four.

These operations in the tens and units positions complete the registration of the product on wheels 13, as follows:

$$\begin{array}{r} 3748200 \\ -31235 \\ \hline 3435850 \\ +24988 \\ \hline 3460838 \end{array}$$
(i. e. $5\times 6247$)
(i. e. $4\times 6247$)

From the above it will be obvious that when the active control gear 606 is set at zero, arm 642 will be held in normal position, so that if tooth 578 finds a gear 606 at zero, when it is moved into cooperative position therewith, trigger 31 will be successively tripped, as called for in Figure 42, and the register carriage will be shifted.

When the carriage arrives in extreme left-hand position, as has been shown, control lever 201 will be retracted during the first quarter cycle of actuator movement, at which time the machine is set to complete a registration, whether additive or subtractive. This will result in the release of key 570, as follows:

When control lever 201 was set to operative position, a pin 312 in said lever (Figs. 26, 27) pressing against a cam face 676 of a lever 677, engaging bar 664, moved a lug 678 on the forward end of said bar out of the path of the bell-crank lever 52 of the mechanism controlled by trigger 31. Upon restoration of lever 201, lug 678 will move into the path of bell-crank lever 52 and, upon its next operation said lever will pull the bar forward, rocking arm 663, shaft 662 and latch arm 653 to release key 570.

Up to this time, key 570 has held the clutch 552, 553 engaged in spite of the periodic release of latch 654. In case, however, key 570 is released by movement of lever 52 during the first quarter cycle of actuator movement, latch 654 will maintain this clutch engaged until the final tripping of trigger 31, to bring the machine to rest. Latch 654 is tripped by means of a finger 679, fast upon the shaft 680 of said latch, rocking of shaft 640 bringing one of the arms 641 in contact with finger 679 to trip the latch.

I claim:

1. In a calculating machine having differential register actuators, means settable to determine additive or subtractive registration, and means for limiting the registration in any given denominational order; multiplier mechanism comprising a settable rotary control member, and cooperating means whereby the angular set position of said member will differentially control adjustment of said determining and said limiting means.

2. In a calculating machine having differential register actuators, means settable to determine additive or subtractive registration, and means for limiting the registration in any given denominational order; multiplier mechanism comprising a differentially settable rotary control member for said determining and said limiting means, and cooperating means whereby advance of said member a number of steps corresponding to certain multiplier digits will effect a similar number of additive registrations in the corresponding denominational order, and whereby advance of said member complementally with relation to other multiplier digits will effect a corresponding number of subtractive registrations in said order.

3. In a calculating machine having differential register actuators, means settable to determine additive or subtractive registration, and means for limiting the registration in any given denominational order; multiplier mechanism comprising a differentially settable rotary control member for said determining and said limiting means, and cooperating means whereby advance of said member a number of steps corresponding to certain multiplier digits will effect a similar number of additive registrations in the correspondng denominatonal order, and whereby advance of said member complementally with relation to other multiplier digits will effect a corresponding number of subtractive registrations in said order, means for modifying a subtractive setting by an additional additive setting, and means for rendering the control means active, to effect the modified registration.

4. In a calculating machine having differential register actuators, means settable to determine additive or subtractive registration, and means for limiting the registration in any given denominational order; multiplier mechanism comprising a differentially settable rotary control member for said determining and said limiting means and having a projection, and cooperating means whereby advance of said control member projection beyond a given angular position will effect subtractive registration.

5. In a calculating machine having differential register actuators, means settable to determine additive or subtractive registration, and means for limiting the registration in any given denominational order; multiplier mechanism comprising a differentially settable rotary control member for said determining and said limiting means and having a projection, and cooperating means whereby setting of said control member projection to a position within one angular zone will determine additive registration and return of said member to normal position by rotation in a given direction, and setting of said projection to position within a second angular zone will determine subtractive registration and return of said member to normal position by rotation in the opposite direction.

6. In a calculating machine having a denominationally shiftable register carriage, product register wheels thereon, differential actuators for said wheels, means settable to determine additive or subtractive registration, normally inactive carriage shifting means, and means for initiating a shifting action of said last-named means; multiplier mechanism comprising a series of members settable from normal position to control said determining and said initiating means, means for rendering said control members successively active, and cooperating means whereby any active control member standing in normal position will effect shifting of said carriage.

7. In a calculating machine having a denominationally shiftable register carriage, jroduct register wheels thereon, differential actuators for said wheels, means settable to determine additive or subtractive registration, normally inactive carriage shifting means, and means for initiating a shifting action of said last-named means; multiplier mechanism comprising a series of settable control members for said determining and said initiating means, means for rendering said control devices successively active, and cooperating means whereby a control member set out of normal position will effect selective additive or subtractive registration, and whereby a control member standing in normal position will effect shifting of said carriage.

8. In a calculating machine having a denominationally shiftable register carriage, register wheels thereon, differential actuators for said wheels movable through an idle zone prior to each cyclic registering action, means operable during movement of said actuators through said idle zone to reverse the direction of movement of said actuators, means automatically operable during reversal of the actuators from additive movement to shift the carriage, and means for initiating movement of said actuators in subtractive direction; means operable to render said initiating means active, and cooperating means for repeatedly operating said reversing means during operation in a single denominational position of said carriage.

9. In a calculating machine having a denominationally shiftable register carriage, register wheels thereon, differential actuators for said wheels movable through an idle zone prior to each cyclic registering action, means operable during movement of said actuators through said idle zone to reverse the direction of movement of said actuators, means automatically operable during reversal of the actuators from additive movement to shift the carriage, and means for initiating movement of said actuators in subtractive direction; means operable to render said initiating means active, cooperating means for repeatedly operating said reversing means during operation in a single denominational position of said carriage, and means for variably timing the action of said last-named means to effect reversal and for carriage shifting.

10. In a calculating machine having a motor, and reversible differential register actuators; differentially settable clutching and rotation reversing mechanism between said motor and said actuators, and means for limiting the registering movement of said actuators in any given denominational order, in combination with multiplier mechanism comprising differentially settable control members for said clutching and reversing and said limiting means, and cooperating means whereby the set position of said control members will differentially control adjustment of said limiting means and alternate additive and subtractive setting of said reversing means.

Signed at Orange, in the county of Essex and State of New Jersey, this 28th day of Sept., A. D., 1931.

EDWIN F. BRITTEN, Jr.